United States Patent
Hamada et al.

(10) Patent No.: US 12,491,931 B2
(45) Date of Patent: Dec. 9, 2025

(54) VEHICLE DRIVING ASSIST DEVICE, VEHICLE DRIVING ASSIST METHOD, AND NON-TRANSITORY STORAGE MEDIUM

(71) Applicant: TOYOTA JIDOSHA KABUSHIKI KAISHA, Toyota (JP)

(72) Inventors: Kentaro Hamada, Toyota (JP); Takeshi Hamaguchi, Seto (JP); Shusaku Sugamoto, Toyota (JP); Shintaro Saigo, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 18/624,633

(22) Filed: Apr. 2, 2024

(65) Prior Publication Data
US 2024/0336299 A1 Oct. 10, 2024

(30) Foreign Application Priority Data
Apr. 5, 2023 (JP) .................. 2023-061204

(51) Int. Cl.
*B62D 5/00* (2006.01)
*B60W 10/20* (2006.01)
*B60W 30/09* (2012.01)
*B60W 30/095* (2012.01)
*B60W 30/12* (2020.01)
(Continued)

(52) U.S. Cl.
CPC ............. *B62D 5/006* (2013.01); *B60W 10/20* (2013.01); *B60W 30/09* (2013.01); *B60W 30/0956* (2013.01); *B60W 30/12* (2013.01); *B60W 50/00* (2013.01); *B62D 15/025* (2013.01); *B60W 2050/0083* (2013.01); *B60W 2510/202* (2013.01); *B60W 2540/18* (2013.01); *B60W 2552/30* (2020.02); *B60W 2552/53* (2020.02)

(58) Field of Classification Search
CPC ... B62D 5/006; B60W 30/09; B60W 30/0956; B60W 30/12; B60W 10/20
See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |

(Continued)

FOREIGN PATENT DOCUMENTS

| | | |
|---|---|---|
| DE | 10 2006 060 837 A1 | 6/2008 |
| JP | 2009-043227 A | 2/2009 |

(Continued)

*Primary Examiner* — George C Jin
(74) *Attorney, Agent, or Firm* — Sughrue Mion, PLLC

(57) ABSTRACT

In a vehicle driving assist device including a control device, the control device is configured to set, in steering assist control, an upper limit value of a steering angle in a counterclockwise direction as a left limit steering angle or an upper limit value of the steering angle in a clockwise direction as a right limit steering angle. When the steering angle exceeds the left limit steering angle in the counterclockwise direction, the control device is configured to apply an assist steering force in the clockwise direction to a steering operation. When the steering angle exceeds the right limit steering angle in the clockwise direction, the control device is configured to apply the assist steering force in the counterclockwise direction to the steering operation.

10 Claims, 27 Drawing Sheets

(51) Int. Cl.
  *B60W 50/00*  (2006.01)
  *B62D 15/02*  (2006.01)

(56)  References Cited

U.S. PATENT DOCUMENTS

| | | | |
|---|---|---|---|
| 8,682,500 | B2 | 3/2014 | Sakugawa |
| 8,818,634 | B2 | 8/2014 | Fujita et al. |
| 9,168,953 | B2 | 10/2015 | Mitsumoto et al. |
| 9,714,034 | B2 | 7/2017 | Otake et al. |
| 9,880,558 | B2 | 1/2018 | Nakamura |
| 9,902,399 | B2 | 2/2018 | Torii et al. |
| 10,345,443 | B2 | 7/2019 | Masui et al. |
| 10,611,240 | B2 | 4/2020 | Masui et al. |
| 2009/0024279 | A1 | 1/2009 | Takeda et al. |
| 2014/0180543 | A1* | 6/2014 | Ueda .................. B62D 15/025 701/41 |
| 2015/0344068 | A1 | 12/2015 | Taniguchi et al. |
| 2018/0022354 | A1* | 1/2018 | Akatsuka ............ B62D 15/026 701/41 |
| 2018/0350242 | A1* | 12/2018 | Fujii ............... B60W 30/18163 |
| 2019/0061743 | A1* | 2/2019 | Ozawa ................ B60W 20/15 |
| 2019/0071080 | A1* | 3/2019 | Shimizu ............... G05D 1/0246 |
| 2020/0039511 | A1* | 2/2020 | Ohmura ............ B60W 40/105 |
| 2020/0148259 | A1* | 5/2020 | Nagae ................ B62D 15/025 |
| 2022/0396310 | A1 | 12/2022 | Hamaguchi et al. |
| 2024/0336299 | A1* | 10/2024 | Hamada ............ B60W 30/0956 |

FOREIGN PATENT DOCUMENTS

| | | |
|---|---|---|
| JP | 2016-107750 A | 6/2016 |
| JP | 2022-188735 A | 12/2022 |
| WO | 2014/109307 A1 | 7/2014 |

\* cited by examiner

VEHICLE DRIVING ASSIST DEVICE, VEHICLE DRIVING ASSIST METHOD, AND NON-TRANSITORY STORAGE MEDIUM

CROSS-REFERENCE TO RELATED APPLICATION

This application claims priority to Japanese Patent Application No. 2023-061204 filed on Apr. 5, 2023, incorporated herein by reference in its entirety.

BACKGROUND

1. Technical Field

The present disclosure relates to a vehicle driving assist device, a vehicle driving assist method, and a non-transitory storage medium.

2. Description of Related Art

There is known a vehicle driving assist device configured such that, in order to assist a driver's operation on a steering wheel (steering operation) when the driver drives a vehicle along a curved road, the curvature radius of the curved road is acquired and, when the curvature radius is small, that is, when the curved road is a sharply curved road, a steering reaction force to be applied to the steering wheel is adjusted so that the driver can easily turn the steering wheel (see, for example, Japanese Unexamined Patent Application Publication No. 2022-188735 (JP 2022-188735 A)).

SUMMARY

The related-art vehicle driving assist device described above detects lane lines on right and left sides of the vehicle based on an image acquired by a camera mounted on the vehicle (camera image), acquires a line passing through the center of a lane in a width direction based on the lane lines, and acquires the curvature radius of that line as the curvature radius of the curved road.

When one of the right and left lane lines cannot be detected based on the camera image, however, the line passing through the center of the road in the width direction cannot be acquired. As a result, the curvature radius of the curved road cannot be acquired. For example, when the vehicle is traveling on the curved road in an appropriate posture, the camera can image both the right and left lane lines. Depending on the posture of the vehicle, there is a possibility that the camera cannot image one of the right and left lane lines. In this case, the curvature radius of the curved road cannot be acquired. Therefore, the steering reaction force to be applied to the steering wheel cannot be determined. As a result, the steering reaction force cannot be applied to the steering operation.

The present disclosure provides a vehicle driving assist device, a vehicle driving assist method, and a non-transitory storage medium in which a steering reaction force can be applied to a steering operation even when one of right and left lane lines of a vehicle cannot be detected.

A first aspect of the present disclosure relates to a vehicle driving assist device including a control device configured to perform steering assist control for applying, to a steering operation, an assist steering force for assisting the steering operation. The steering operation is performed by a driver of a target vehicle to steer the target vehicle. The control device is configured to, in the steering assist control, set an upper limit value of a steering angle in a counterclockwise direction as a left limit steering angle, or an upper limit value of the steering angle in a clockwise direction as a right limit steering angle. The steering angle is a rotation angle of a steering shaft mounted on the target vehicle. The left limit steering angle is set based on a traveling condition of the target vehicle and a positional relationship between the target vehicle and a left traveling road boundary. The left traveling road boundary is a boundary on a left side of the target vehicle. The left traveling road boundary defines a traveling road where the target vehicle is traveling. The right limit steering angle is set based on the traveling condition and a positional relationship between the target vehicle and a right traveling road boundary. The right traveling road boundary is a boundary on a right side of the target vehicle. The right traveling road boundary defines the traveling road. The control device is configured to, in the steering assist control, when the steering angle exceeds in the counterclockwise direction the left limit steering angle, apply the assist steering force in the clockwise direction based on a difference between the steering angle and the left limit steering angle to the steering operation. The control device is configured to, in the steering assist control, when the steering angle exceeds in the clockwise direction the right limit steering angle, apply the assist steering force in the counterclockwise direction based on a difference between the steering angle and the right limit steering angle to the steering operation.

With the vehicle driving assist device according to the present disclosure, the assist steering force is determined based on the left limit steering angle or the right limit steering angle. The left limit steering angle is determined based on the traveling condition of the target vehicle and the positional relationship between the target vehicle and the left traveling road boundary. The right limit steering angle is determined based on the traveling condition of the target vehicle and the positional relationship between the target vehicle and the right traveling road boundary. Therefore, the assist steering force can be determined when at least one of the left traveling road boundary and the right traveling road boundary can be set and the traveling condition of the target vehicle can be detected. Thus, the assist steering force can be applied to the steering operation even if one of the left traveling road boundary and the right traveling road boundary cannot be set.

In the vehicle driving assist device according to the first aspect of the present disclosure, the control device may be configured to, when the left traveling road boundary or the right traveling road boundary is not settable, perform the steering assist control by using the left traveling road boundary or the right traveling road boundary that is settable.

With the vehicle driving assist device according to the present disclosure, the assist steering force can be applied to the steering operation even if only one of the left traveling road boundary and the right traveling road boundary can be set.

In the vehicle driving assist device according to the first aspect of the present disclosure, the control device may be configured to set the left traveling road boundary and the right traveling road boundary based on lane boundaries and forward road environment information on an environment of a road ahead of the target vehicle. The lane boundaries define a lane where the target vehicle is traveling.

With the vehicle driving assist device according to the present disclosure, the assist steering force can be applied to the steering operation in consideration of the lane boundaries and the forward road environment information.

In the vehicle driving assist device according to the first aspect of the present disclosure, the control device may be configured to acquire, as the forward road environment information, information indicating that a road where the target vehicle is traveling is a curved road. The control device may be configured to, when the information indicating that the road where the target vehicle is traveling is the curved road is acquired as the forward road environment information, set the left traveling road boundary and the right traveling road boundary to increase a turning radius of the target vehicle while the target vehicle is traveling on the curved road.

With the vehicle driving assist device according to the present disclosure, the target vehicle travels on the curved road along a route with a large turning radius. Therefore, the traveling stability of the target vehicle on the curved road increases.

In the vehicle driving assist device according to the first aspect of the present disclosure, the control device may be configured to acquire, as the forward road environment information, information indicating that a road where the target vehicle is traveling is a curved road. The control device may be configured to, when the control device acquires the information indicating that the road where the target vehicle is traveling is the curved road as the forward road environment information, set the left traveling road boundary and the right traveling road boundary to cause the target vehicle to enter the curved road from a side closer to a lane boundary on an outer side of turning out of the lane boundaries than a lane boundary on an inner side of turning out of the lane boundaries, travel away from the lane boundary on the outer side of turning and closer to the lane boundary on the inner side of turning after the target vehicle enters the curved road, and travel away from the lane boundary on the inner side of turning and closer to the lane boundary on the outer side of turning, and exit the curved road from a side closer to the lane boundary on the outer side of turning after the target vehicle travels closer to the lane boundary on the inner side of turning.

With the vehicle driving assist device according to the present disclosure, the target vehicle travels on the curved road along a route with a large turning radius. Therefore, the traveling stability of the target vehicle on the curved road increases.

In the vehicle driving assist device according to the first aspect of the present disclosure, the control device may be configured to acquire, as the forward road environment information, information indicating that an obstacle is present on a road ahead of the target vehicle. The control device may be configured to, when the information indicating that the obstacle is present on the road ahead of the target vehicle is acquired as the forward road environment information, set the left traveling road boundary and the right traveling road boundary to define the traveling road of the target vehicle off the obstacle.

With the vehicle driving assist device according to the present disclosure, the driver can easily perform the steering operation for driving the target vehicle off the obstacle.

In the vehicle driving assist device according to the first aspect of the present disclosure, the control device may be configured not to apply the assist steering force in the clockwise direction to the steering operation when the steering angle does not exceed the left limit steering angle in the counterclockwise direction. The control device may be configured not to apply the assist steering force in the counterclockwise direction to the steering operation when the steering angle does not exceed the right limit steering angle in the clockwise direction.

With the vehicle driving assist device according to the present disclosure, the assist steering force in the clockwise direction is not applied to the steering operation when the steering angle does not exceed the left limit steering angle in the counterclockwise direction. Further, the assist steering force in the counterclockwise direction is not applied to the steering operation when the steering angle does not exceed the right limit steering angle in the clockwise direction. Thus, it is possible to provide the assist respecting the steering operation of the driver.

In the vehicle driving assist device according to the first aspect of the present disclosure, the control device may be configured to, when the steering angle exceeds the left limit steering angle in the counterclockwise direction, apply, to the steering operation, the assist steering force in the clockwise direction that increases as the difference between the steering angle and the left limit steering angle increases. The control device may be configured to, when the steering angle exceeds the right limit steering angle in the clockwise direction, apply, to the steering operation, the assist steering force in the counterclockwise direction that increases as the difference between the steering angle and the right limit steering angle increases.

With the vehicle driving assist device according to the present disclosure, a larger assist steering force in the clockwise direction can be applied to the steering operation as the steering angle exceeds the left limit steering angle in the counterclockwise direction more greatly. Further, a larger assist steering force in the counterclockwise direction can be applied to the steering operation as the steering angle exceeds the right limit steering angle in the clockwise direction more greatly.

A second aspect of the present disclosure relates to a vehicle driving assist method for performing steering assist control for applying, to a steering operation, an assist steering force for assisting the steering operation. The vehicle driving assist method includes setting, in the steering assist control, an upper limit value of a steering angle in a counterclockwise direction as a left limit steering angle or an upper limit value of the steering angle in a clockwise direction as a right limit steering angle, applying, in the steering assist control, when the steering angle exceeds in the counterclockwise direction the left limit steering angle, the assist steering force based on a difference between the steering angle and the left limit steering angle in the clockwise direction to the steering operation, and applying, in the steering assist control, when the steering angle exceeds in the clockwise direction the right limit steering angle, the assist steering force in the counterclockwise direction based on a difference between the steering angle and the right limit steering angle to the steering operation. The steering operation is performed by a driver of a target vehicle to steer the target vehicle. The steering angle is a rotation angle of a steering shaft mounted on the target vehicle. The left limit steering angle is set based on a traveling condition of the target vehicle and a positional relationship between the target vehicle and a left traveling road boundary. The left traveling road boundary is a boundary on a left side of the target vehicle. The left traveling road boundary defines a traveling road where the target vehicle is traveling. The right limit steering angle is set based on the traveling condition and a positional relationship between the target vehicle and a right traveling road boundary. The right traveling road boundary is a boundary on a right side of the target vehicle. The right traveling road boundary defines the traveling road.

With the vehicle driving assist method according to the present disclosure, for the same reason as that described above, the assist steering force can be applied to the steering operation even if one of the left traveling road boundary and the right traveling road boundary cannot be set.

A third aspect of the present disclosure relates to a non-transitory storage medium storing instructions that are executable by one or more processors and that cause the one or more processors to perform functions. The one or more processors are included in a vehicle driving assist device including a control device configured to perform steering assist control for applying, to a steering operation, an assist steering force for assisting the steering operation. The functions include setting, in the steering assist control, an upper limit value of a steering angle in a counterclockwise direction as a left limit steering angle or an upper limit value of the steering angle in a clockwise direction as a right limit steering angle, applying, in the steering assist control, when the steering angle exceeds in the counterclockwise direction the left limit steering angle, the assist steering force in the clockwise direction based on a difference between the steering angle and the left limit steering angle to the steering operation, and applying, in the steering assist control, when the steering angle exceeds in the clockwise direction the right limit steering angle, the assist steering force in the counterclockwise direction based on a difference between the steering angle and the right limit steering angle to the steering operation. The steering operation is performed by a driver of a target vehicle to steer the target vehicle. The steering angle is a rotation angle of a steering shaft mounted on the target vehicle. The left limit steering angle is set based on a traveling condition of the target vehicle and a positional relationship between the target vehicle and a left traveling road boundary. The left traveling road boundary is a boundary on a left side of the target vehicle. The left traveling road boundary defines a traveling road where the target vehicle is traveling. The right limit steering angle is set based on the traveling condition and a positional relationship between the target vehicle and a right traveling road boundary. The right traveling road boundary is a boundary on a right side of the target vehicle. The right traveling road boundary defines the traveling road.

With the non-transitory storage medium according to the present disclosure, for the same reason as that described above, the assist steering force can be applied to the steering operation even if one of the left traveling road boundary and the right traveling road boundary cannot be set.

The constituent elements according to the present disclosure are not limited to those according to an embodiment of the present disclosure to be described later with reference to the drawings. Other objects, other features, and accompanying advantages of the present disclosure will easily be understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
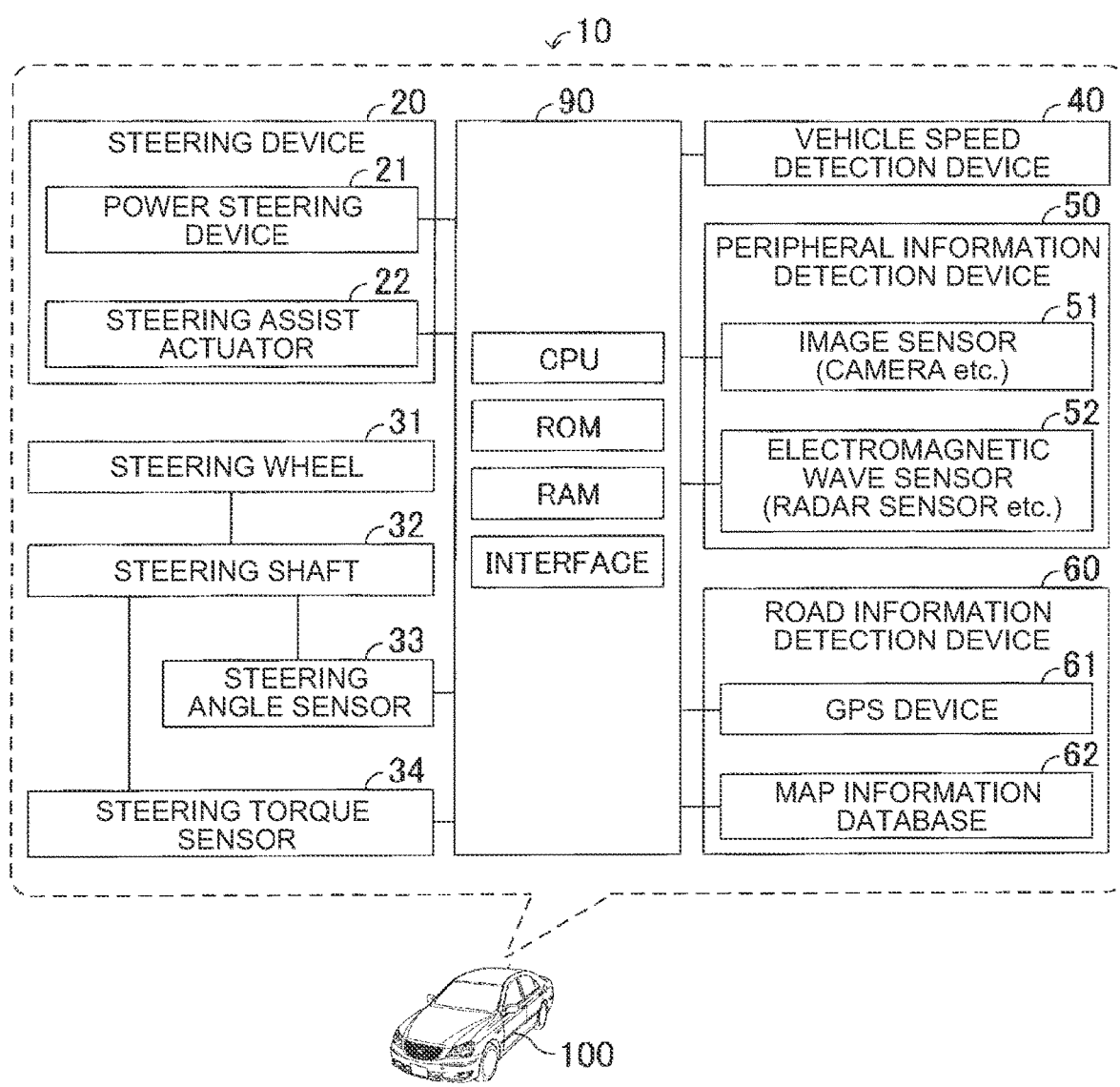
FIG. 1 is a diagram showing a vehicle driving assist device according to an embodiment of the present disclosure.

A vehicle driving assist device, a vehicle driving assist method, and a non-transitory storage medium according to an embodiment of the present disclosure will be described below with reference to the drawings. FIG. 1 shows a vehicle driving assist device 10. The vehicle driving assist device 10 is mounted on a target vehicle 100. The vehicle driving assist device 10 will be described below taking an example in which an operator of the target vehicle 100 is a person who rides in the target vehicle 100 and drives the target vehicle 100 (i.e., a driver of the target vehicle 100).

The operator of the target vehicle 100 may be a person who remotely drives the target vehicle 100 without riding in the target vehicle 100 (i.e., a remote operator of the target vehicle 100). When the operator of the target vehicle 100 is a remote operator, the vehicle driving assist device 10 is mounted on each of the target vehicle 100 and remote control equipment installed outside the target vehicle 100 to remotely drive the target vehicle 100. The functions of the vehicle driving assist device 10 described below are shared between the vehicle driving assist device 10 mounted on the target vehicle 100 and the vehicle driving assist device 10 mounted on the remote control equipment.

The present disclosure can also be applied to a vehicle that travels by switching as appropriate between manual driving in which the operator performs a driving operation and automated driving or autonomous driving in which a control device such as an electronic control unit (ECU) automatically or autonomously performs a driving operation without the operator's driving operation. In this case, the present disclosure is applied to a case where the vehicle is traveling by manual driving.

The example described below is based on a region or country where the laws etc. stipulate that vehicles travel on a left side of a road. Therefore, the right and left in the following description will be reversed when the present disclosure is applied to a vehicle that travels in a region or country where the laws etc. stipulate that vehicles travel on a right side of a road.

As shown in FIG. 1, the vehicle driving assist device 10 includes an electronic control unit (ECU) 90 as a control device. The ECU 90 includes a microcomputer as a main component. The microcomputer includes a central processing unit (CPU), a storage medium such as a read only memory (ROM), a random access memory (RAM), or a non-volatile memory, and an interface. The CPU executes instructions, programs, or routines stored in the storage medium to implement various functions. In particular, the vehicle driving assist device 10 in this example stores programs that implement various types of control to be executed by the vehicle driving assist device 10 in the storage medium.

The vehicle driving assist device 10 may be configured to update the programs stored in the storage medium through wireless communication (e.g., Internet communication) with an external device.

The target vehicle 100 includes a steering device 20. The steering device 20 is a device for steering the target vehicle 100, and includes a power steering device 21 and a steering assist actuator 22 in this example.

The power steering device 21 outputs a steering torque (steering force) for steering the target vehicle 100.

The steering assist actuator 22 applies a force (assist steering force) to a steering wheel 31 when a force for rotating the steering wheel 31 is applied to the steering wheel 31. In other words, when the driver applies the force for rotating the steering wheel 31 to the steering wheel 31, the steering assist actuator 22 applies the force (assist steering force) to the rotating operation (steering wheel operation or steering operation).

The power steering device 21 and the steering assist actuator 22 are electrically connected to the ECU 90. The ECU 90 can control the steering torque to be output from the power steering device 21 by controlling operation of the power steering device 21, and can control the assist steering force by controlling operation of the steering assist actuator 22.

The target vehicle 100 includes the steering wheel 31, a steering shaft 32, a steering angle sensor 33, a steering torque sensor 34, a vehicle speed detection device 40, a peripheral information detection device 50, and a road information detection device 60.

The steering angle sensor 33 detects a rotation angle of the steering shaft 32 with respect to a neutral position, and is electrically connected to the ECU 90. The steering angle sensor 33 transmits information on the detected rotation angle of the steering shaft 32 to the ECU 90. The ECU 90 acquires the rotation angle of the steering shaft 32 as a steering angle δ based on the information.

The steering torque sensor 34 detects a torque input to the steering shaft 32 by the driver via the steering wheel 31, and is electrically connected to the ECU 90. The steering torque sensor 34 transmits information on the detected torque to the ECU 90. The ECU 90 acquires the torque input to the steering shaft 32 by the driver via the steering wheel 31 (driver input torque) based on the information. The ECU 90 acquires a requested steering torque based on the steering angle δ, the driver input torque, and a target-vehicle speed V (traveling speed of the target vehicle 100), and controls the operation of the steering device 20 to output the requested steering torque from the steering device 20.

The vehicle speed detection device 40 detects a traveling speed of the target vehicle 100, and is typified by a wheel speed sensor. The vehicle speed detection device 40 is electrically connected to the ECU 90. The vehicle speed detection device 40 transmits information on the detected traveling speed of the target vehicle 100 to the ECU 90. The ECU 90 acquires the traveling speed of the target vehicle 100 as the target-vehicle speed V based on the information.

The peripheral information detection device 50 detects information on the periphery of the target vehicle 100, and includes an image sensor 51 and an electromagnetic wave sensor 52 in this example. Examples of the image sensor 51 include a camera. Examples of the electromagnetic wave sensor 52 include a radar sensor (such as a millimeter wave radar). The peripheral information detection device 50 may include, as the electromagnetic wave sensor 52, an acoustic wave sensor such as an ultrasonic sensor (clearance sonar) or an optical sensor such as a laser radar (light detection and ranging (LiDAR)).

The image sensor 51 is electrically connected to the ECU 90. The image sensor 51 captures an image of the periphery of the target vehicle 100, and transmits information on the captured image to the ECU 90. The ECU 90 acquires information on the periphery of the target vehicle 100 as peripheral detection information IS based on the information (camera image information IC).

The electromagnetic wave sensor 52 is electrically connected to the ECU 90. The electromagnetic wave sensor 52 emits a radio wave, and receives the radio wave reflected by an object (reflected wave). The electromagnetic wave sensor 52 transmits information on the emitted radio wave and the received radio wave (reflected wave) to the ECU 90. In other words, the electromagnetic wave sensor 52 detects an object present around the target vehicle 100, and transmits information on the detected object to the ECU 90. The ECU 90 can acquire information on the object present around the target vehicle 100 as the peripheral detection information IS based on the information (object information IO). In this example, the object is a vehicle, a motorcycle, a bicycle, a person, etc.

The road information detection device 60 includes a global positioning system (GPS) device 61 and a map information database 62.

The GPS device 61 receives a so-called GPS signal, and is electrically connected to the ECU 90. The ECU 90 acquires the GPS signal via the GPS device 61. The ECU 90 acquires a current position P100 of the target vehicle 100 based on the acquired GPS signal.

The map information database 62 stores map information including information on roads, etc., and is electrically connected to the ECU 90. The ECU 90 acquires information on a road where the target vehicle 100 is currently traveling (target-vehicle traveling road RD) as road information IR based on the current position P100 of the target vehicle 100.

Operation of Vehicle Driving Assist Device

Next, operation of the vehicle driving assist device 10 will be described.

As described in detail later, the vehicle driving assist device 10 performs steering assist control for applying an assist steering force to a steering operation (steering wheel operation) performed by the driver of the target vehicle 100 to steer the target vehicle 100, thereby assisting the steering operation (steering wheel operation).

In the steering assist control, the vehicle driving assist device 10 sets an upper limit value of a counterclockwise steering angle as a left limit steering angle based on traveling conditions of the target vehicle 100 and a positional relationship between the target vehicle 100 and a left traveling road boundary that is a boundary on a left side of the target vehicle 100 that defines a traveling road where the target vehicle 100 is traveling, or sets an upper limit value of a clockwise steering angle as a right limit steering angle based on the traveling conditions of the target vehicle 100 and a positional relationship between the target vehicle 100 and a right traveling road boundary that is a boundary on a right side of the target vehicle 100 that defines the traveling road where the target vehicle 100 is traveling.

When the steering angle exceeds the left limit steering angle counterclockwise, the vehicle driving assist device 10 applies a clockwise assist steering force to the steering operation (steering wheel operation) based on a difference between the steering angle and the left limit steering angle (left limit steering angle difference). When the steering angle exceeds the right limit steering angle clockwise, the vehicle driving assist device 10 applies a counterclockwise assist steering force to the steering operation (steering wheel operation) based on a difference between the steering angle and the right limit steering angle (right limit steering angle difference).

When the left traveling road boundary or the right traveling road boundary cannot be set, the vehicle driving assist device 10 executes the steering assist control by using the left traveling road boundary or the right traveling road boundary that can be set.

Figure 2:
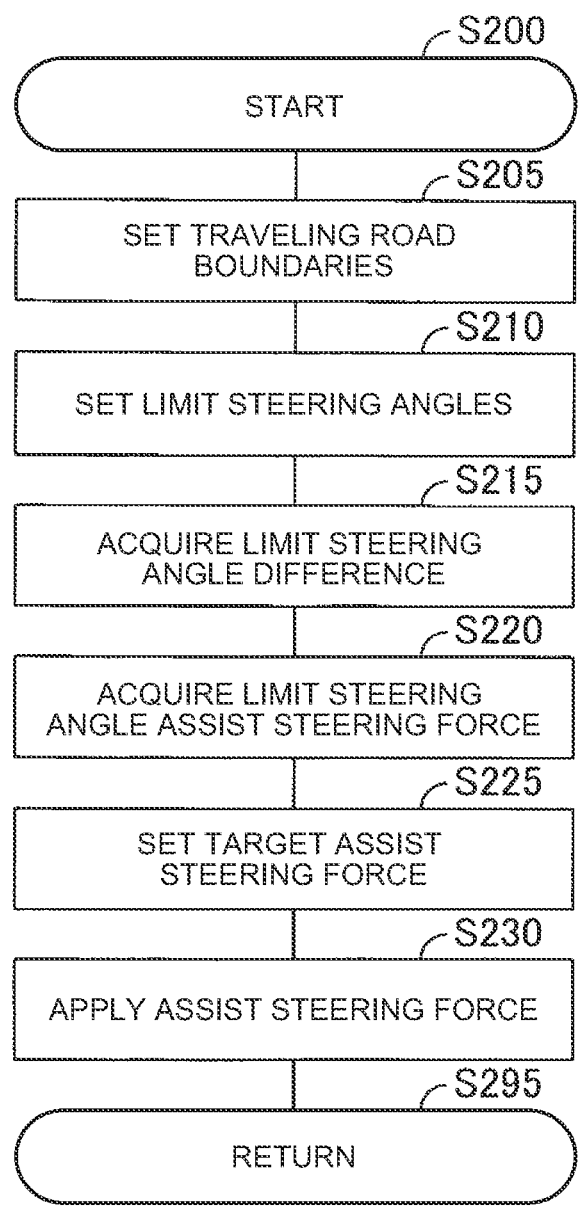
FIG. 2 is a flowchart showing a routine to be executed by the vehicle driving assist device according to the embodiment of the present disclosure.

More specifically, the vehicle driving assist device 10 executes the steering assist control by executing a routine shown in FIG. 2 at a predetermined calculation cycle. At a predetermined timing, the vehicle driving assist device 10 starts a process from step S200 of the routine shown in FIG. 2, and advances the process to step S205 to set traveling road boundaries MB.

Figure 3:
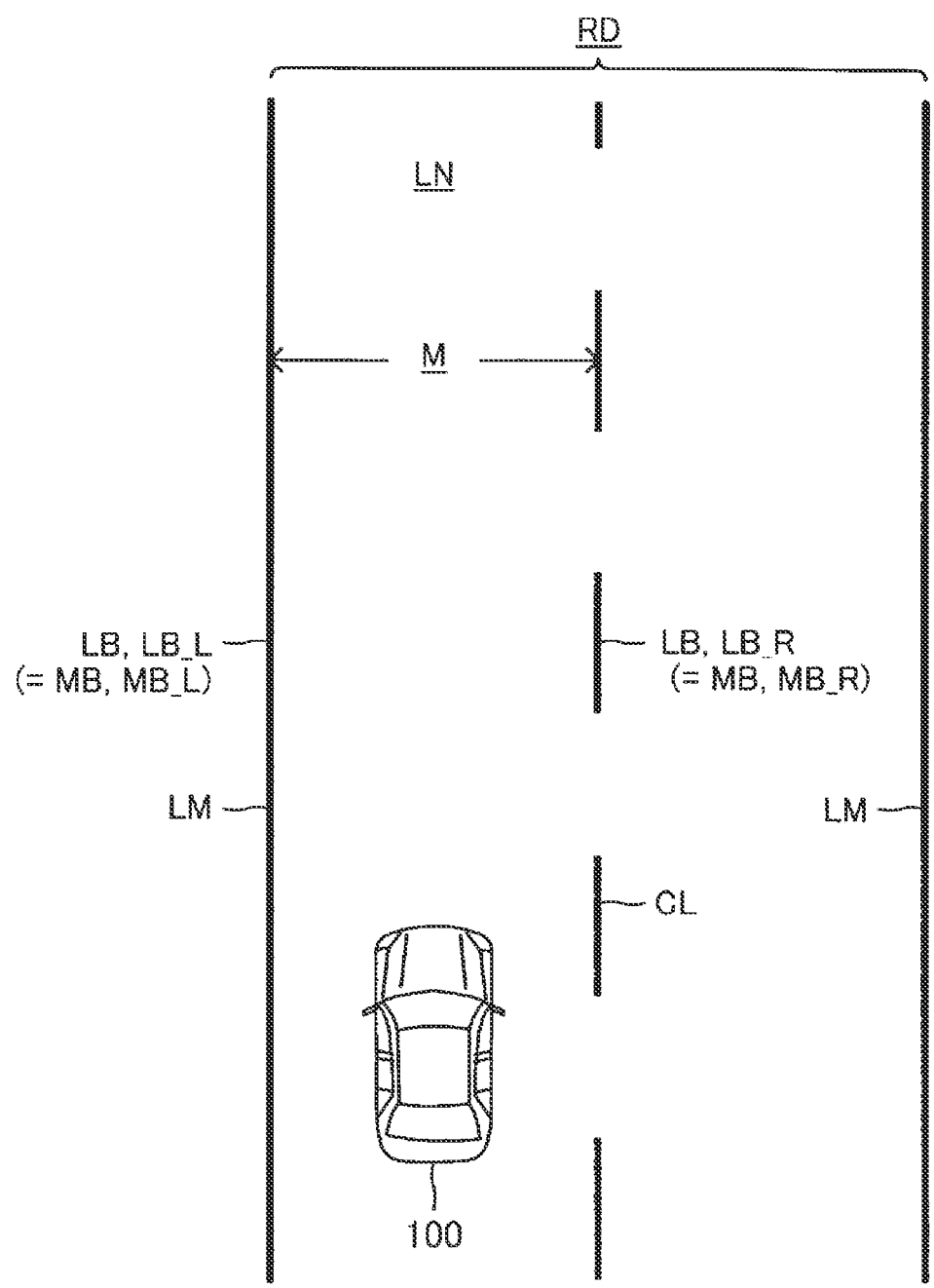
FIG. 3 is a diagram showing traveling road boundaries in a situation where a target vehicle is traveling on a road with one lane on each side and a center line at the center of the road.

As shown in FIG. 3, the traveling road boundaries MB are boundaries of a traveling road where the target vehicle 100 travels, and are set based on lane boundaries LB. The lane boundaries LB are boundaries that define a target-vehicle traveling lane LN, and are acquired based on the peripheral detection information IS (in particular, the camera image information IC). The target-vehicle traveling lane LN is a lane where the target vehicle 100 is traveling.

In this example, the traveling road boundaries MB include a left traveling road boundary MB_L and a right traveling road boundary MB_R, and the lane boundaries LB include a left lane boundary LB_L and a right lane boundary LB_R. The left traveling road boundary MB_L is set based on the left lane boundary LB_L, and the right traveling road boundary MB_R is set based on the right lane boundary LB_R.

The left lane boundary LB_L is any one of, for example, (1) a lane line provided on the target-vehicle traveling road RD and present immediately on the left side of the target vehicle 100, (2) a boundary between the target-vehicle traveling road RD and a curb provided at the left end of the target-vehicle traveling road RD and present immediately on the left side of the target vehicle 100, and (3) a guardrail provided at the left end of the target-vehicle traveling road RD and present immediately on the left side of the target vehicle 100.

The right lane boundary LB_R is any one of, for example, (1) a lane line provided on the target-vehicle traveling road RD and present immediately on the right side of the target vehicle 100, (2) a boundary between the target-vehicle traveling road RD and a curb provided at the right end of the target-vehicle traveling road RD and present immediately on the right side of the target vehicle 100, (3) a guardrail provided at the right end of the target-vehicle traveling road RD and present immediately on the right side of the target vehicle 100, and (4) a center line provided on the target-vehicle traveling road RD and present immediately on the right side of the target vehicle 100.

For example, when the target-vehicle traveling road RD has one lane on each side with a center line CL and has lane lines LM at the right and left ends of the target-vehicle traveling road RD as shown in FIG. 3, the left lane boundary LB_L is the left lane line LM, and the right lane boundary LB_R is the center line CL.

Figure 4:
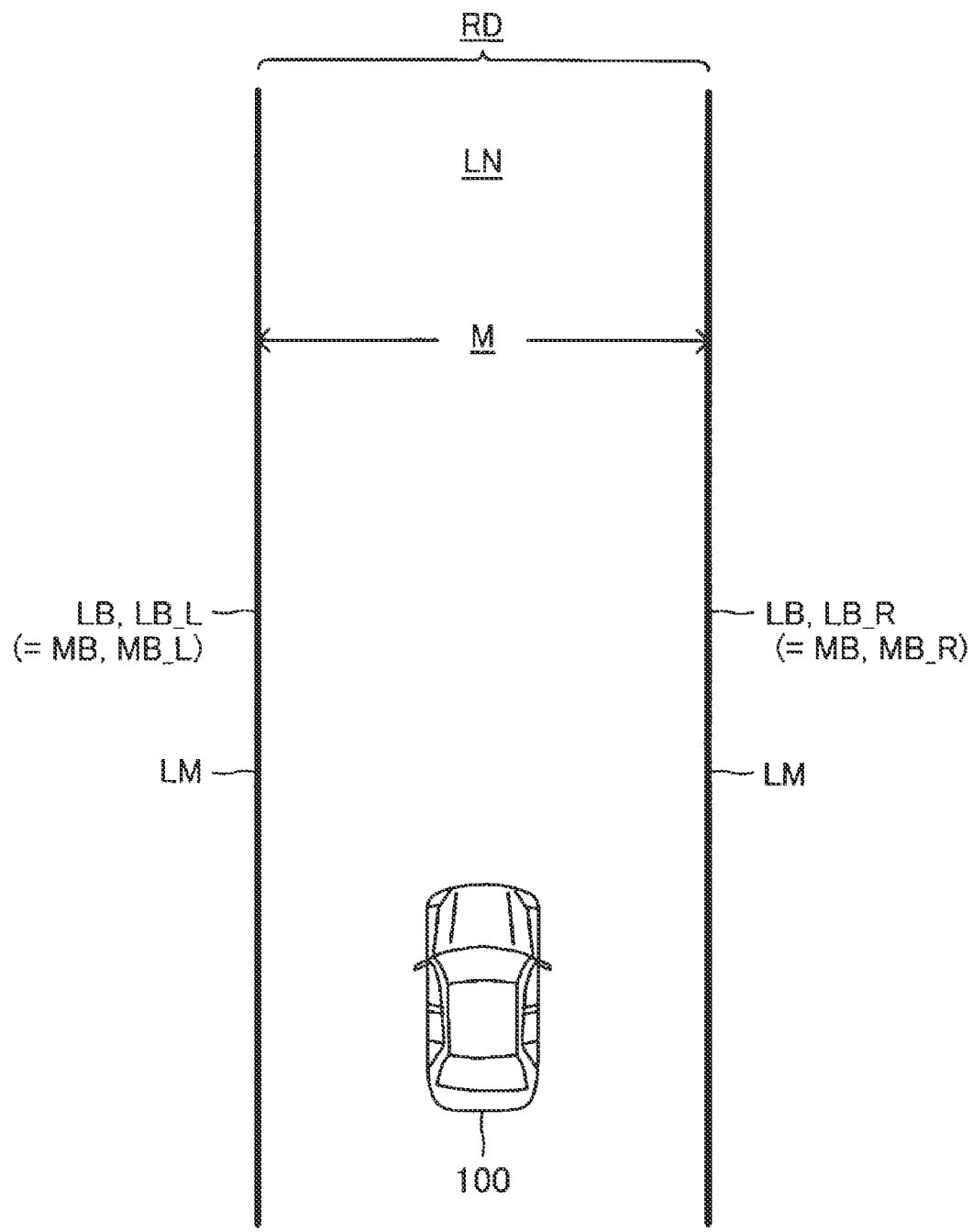
FIG. 4 is a diagram showing traveling road boundaries in a situation where the target vehicle is traveling on a road with no center line at the center of the road.

When the target-vehicle traveling road RD has no center line CL and has lane lines LM at the right and left ends of the target-vehicle traveling road RD as shown in FIG. 4, the left lane boundary LB_L is the left lane line LM, and the right lane boundary LB_R is the right lane line LM.

The vehicle driving assist device 10 acquires the lane boundaries LB based on the peripheral detection information IS (in particular, the camera image information IC), and sets the traveling road boundaries MB based on the lane boundaries LB. In this example, the vehicle driving assist device 10 sets the lane boundaries LB as the traveling road boundaries MB. As described later, the vehicle driving assist device 10 may set, as the traveling road boundaries MB, lines at predetermined distances inward from the lane boundaries LB (toward the center of the target-vehicle traveling lane LN).

Next, the vehicle driving assist device 10 advances the process to step S210, and sets upper limit values of the steering angle δ of the target vehicle 100 as limit steering angles δlim based on the traveling conditions of the target vehicle 100 and positional relationships between the target vehicle 100 and the traveling road boundaries MB.

In this example, the limit steering angles δlim include a left limit steering angle δlim_L and a right limit steering angle δlim_R. The left limit steering angle δlim_L is a limit steering angle δlim set based on, for example, a positional relationship between the target vehicle 100 and the left traveling road boundary MB_L, and the right limit steering angle δlim_R is a limit steering angle δlim set based on, for example, a positional relationship between the target vehicle 100 and the right traveling road boundary MB_R.

The limit steering angle δlim can be set by various methods. In this example, it is set by calculation according to Equation 1 or 2.

$$\delta \lim = k \times \arcsin(y/x) \quad (1)$$

$$\delta \lim = k \times V \times (2y(x^2 + y^2)) \quad (2)$$

In Equations 1 and 2, "k" is a predetermined coefficient for calculating an appropriate limit steering angle δlim according to Equation 1 or 2, and is set by calculation according to Equation 3.

$$k = n \times K \times (1 + A \times V^2) \times L/V \quad (3)$$

In Equation 3, "n" is a gear ratio of a steering box, "K" is a coefficient (adapted value) obtained through experiments etc. so that an appropriate coefficient k can be acquired by Equation 3, "A" is a so-called stability factor, "V" is a target-vehicle speed, and "L" is a wheelbase of the target vehicle 100.

In Equations 1 and 2, "x" is a distance traveled by the target vehicle 100 in a longitudinal direction during a predetermined period Δt (e.g., a preview period described later) (see FIG. 5A), and is calculated by multiplying a speed component of the target-vehicle speed V in the longitudinal direction of the target vehicle 100 (longitudinal speed component Vx) by the predetermined period Δt (x=Vx×Δt). Further, "y" is a distance between the target vehicle 100 and the traveling road boundary MB after the predetermined period Δt (see FIG. 5A).

Therefore, the vehicle driving assist device 10 acquires the distance x by multiplying the longitudinal speed component Vx by the predetermined period Δt, acquires a distance between the target vehicle 100 and the left traveling road boundary MB_L after the predetermined period Δt as a left lateral distance y_L, and acquires a distance between the target vehicle 100 and the right traveling road boundary MB_R after the predetermined period Δt as a right lateral distance y_R. The distance between the target vehicle 100 and the left traveling road boundary MB_L after the predetermined period Δt is one positional relationship between the target vehicle 100 and the left traveling road boundary MB_L, and the distance between the target vehicle 100 and the right traveling road boundary MB_R after the predetermined period Δt is one positional relationship between the target vehicle 100 and the right traveling road boundary MB_R.

Figure 5A:
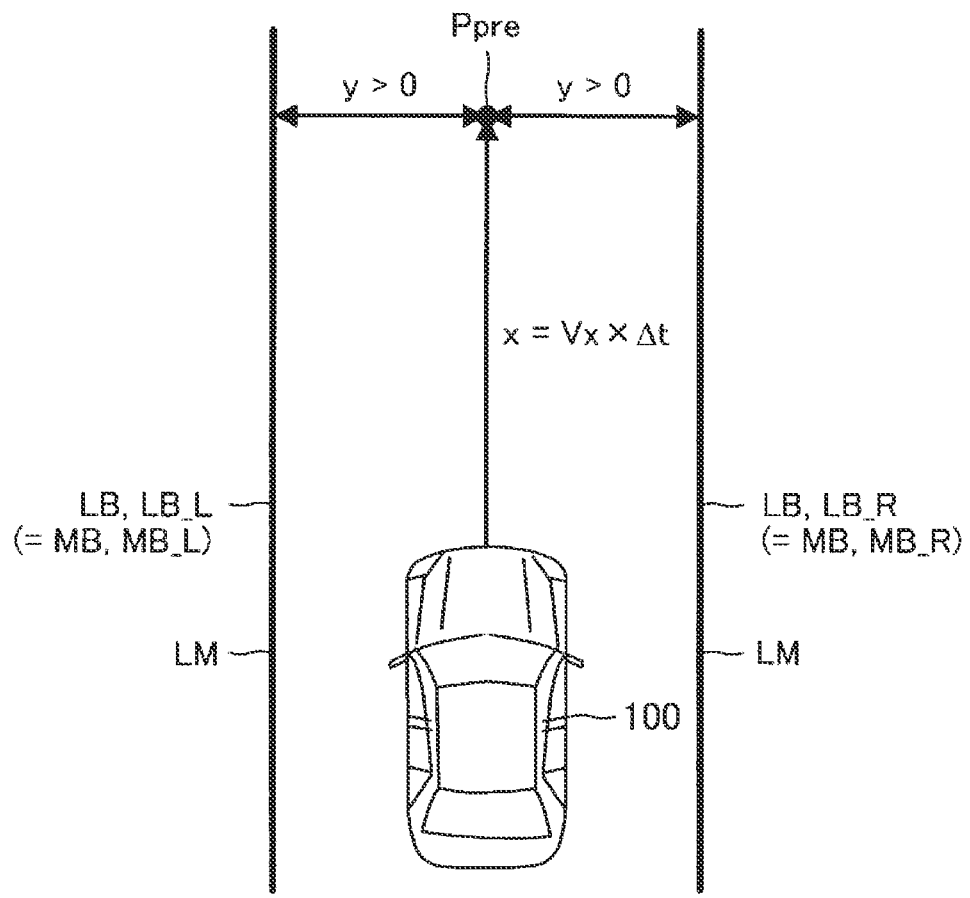
FIG. 5A is a diagram showing parameters to be used to acquire limit steering angles.
Figure 5B:
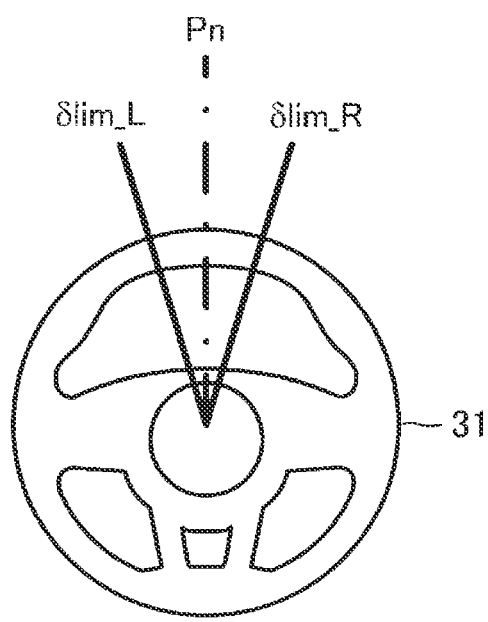
FIG. 5B is a diagram showing a left limit steering angle and a right limit steering angle.

When a position (predicted position Ppre) of the target vehicle 100 after the predetermined period Δt is between the left traveling road boundary MB_L and the right traveling road boundary MB_R as shown in FIG. 5A, the left lateral distance y_L and the right lateral distance y_R are values equal to or larger than zero. In this case, as shown in FIG. 5B, the left limit steering angle δlim_L is an angle counterclockwise from a neutral position Pn of the steering wheel 31, and the right limit steering angle δlim_R is an angle clockwise from the neutral position Pn of the steering wheel 31.

Figure 6A:
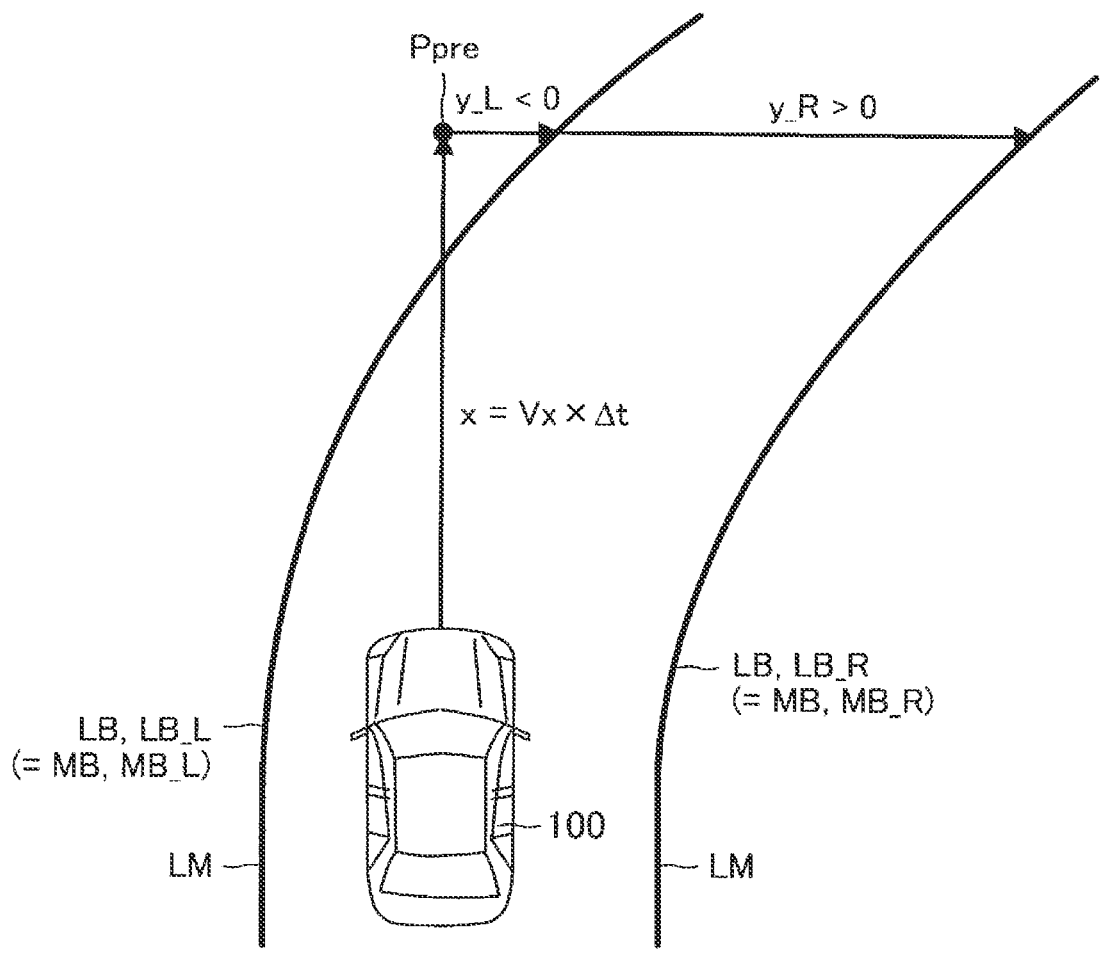
FIG. 6A is a diagram showing parameters to be used to acquire the limit steering angles.
Figure 6B:
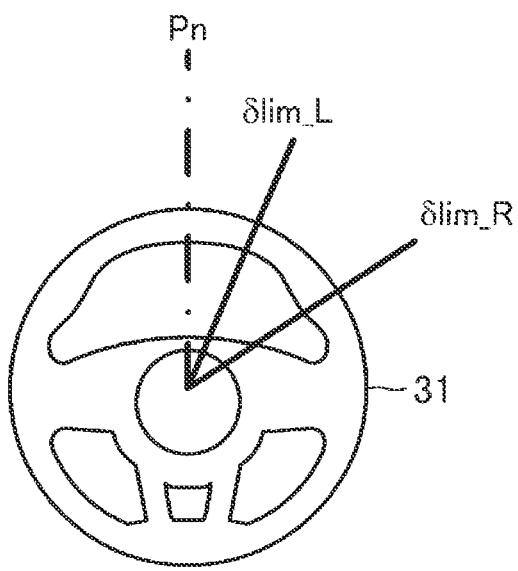
FIG. 6B is a diagram showing the left limit steering angle and the right limit steering angle.

When the predicted position Ppre is on a left side (outer side) of the left traveling road boundary MB_L as shown in FIG. 6A, the right lateral distance y_R is a value equal to or larger than zero, but the left lateral distance y_L is a value smaller than zero. In this case, as shown in FIG. 6B, both the left limit steering angle δlim_L and the right limit steering angle δlim_R are angles clockwise from the neutral position Pn of the steering wheel 31.

Similarly, when the predicted position Ppre is on a right side (outer side) of the right traveling road boundary MB_R, the left lateral distance y_L is a value equal to or larger than zero, but the right lateral distance y_R is a value smaller than zero. In this case, both the left limit steering angle δlim_L and the right limit steering angle δlim_R are angles counterclockwise from the neutral position Pn of the steering wheel 31.

In this way, the vehicle driving assist device 10 acquires the target-vehicle speed V and the position of the target vehicle 100 with respect to the traveling road boundaries MB as the traveling conditions of the target vehicle 100, and acquires the limit steering angles Δlim based on the target-vehicle speed V and the position of the target vehicle 100 with respect to the traveling road boundaries MB.

Next, the vehicle driving assist device 10 advances the process to step S215, and acquires a limit steering angle difference Δδlim.

More specifically, the vehicle driving assist device 10 first acquires a left limit steering angle difference Δδlim_L and a right limit steering angle difference Δδlim_R. The left limit steering angle difference Δδlim_L is a difference between a current steering angle δ and the left limit steering angle δlim_L, and is acquired by subtracting the left limit steering angle δlim_L from the current steering angle δ (Δδlim_L=δ−δlim_L). The right limit steering angle difference Δδlim_R is a difference between a current steering angle δ and the right limit steering angle δlim_R, and is acquired by subtracting the right limit steering angle δlim_R from the current steering angle δ (Δδlim_R=δ−δlim_R).

Therefore, when the steering angle δ is an angle between the left limit steering angle δlim_L and the right limit steering angle δlim_R, both the left limit steering angle difference Δδlim_L and the right limit steering angle difference Δδlim_R are values equal to or smaller than zero. In other words, when the steering angle δ does not exceed the left limit steering angle δlim_L counterclockwise and does not exceed the right limit steering angle δlim_R clockwise, both the left limit steering angle difference Δδlim_L and the right limit steering angle difference Δδlim_R are values equal to or smaller than zero.

In this case, the vehicle driving assist device 10 acquires a zero value as the limit steering angle difference Δδlim.

When the steering angle δ is an angle counterclockwise from the left limit steering angle δlim_L, the left limit steering angle difference Δδlim_L is a value larger than zero. In other words, when the steering angle δ exceeds the left limit steering angle δlim_L counterclockwise, the left limit steering angle difference Δδlim_L is a value larger than zero. Since the steering angle δ at this time is not an angle clockwise from the right limit steering angle δlim_R, the right limit steering angle difference Δδlim_R is a value equal to or smaller than zero.

In this case, the vehicle driving assist device 10 acquires the left limit steering angle difference Δδlim_L that is a value larger than zero as the limit steering angle difference Δδlim.

When the steering angle δ is an angle clockwise from the right limit steering angle δlim_R, the right limit steering angle difference Δδlim_R is a value larger than zero. In other words, when the steering angle δ exceeds the right limit steering angle δlim_R clockwise, the right limit steering angle difference Δδlim_R is a value larger than zero. Since the steering angle δ at this time is not an angle counterclockwise from the left limit steering angle δlim_L, the left limit steering angle difference Δδlim_L is a value equal to or smaller than zero.

In this case, the vehicle driving assist device 10 acquires the right limit steering angle difference Δδlim_R that is a value larger than zero as the limit steering angle difference Δδlim.

Next, the vehicle driving assist device 10 advances the process to step S220, and acquires the limit steering angle assist steering force Fδlim based on the limit steering angle difference Δδlim.

In this example, the limit steering angle assist steering force Fδlim is acquired by calculation according to Equation 4.

$$F\delta \lim = Kintr (\Delta\delta \lim) \quad (4)$$

In Equation 4, "Kintr" is a function that outputs the limit steering angle assist steering force Fδlim based on the limit steering angle difference Δδlim. The function Kintr is predetermined to output an appropriate limit steering angle assist steering force Fδlim based on the limit steering angle difference Δδlim.

In this example, the limit steering angle assist steering force Fδlim output by the function Kintr is zero when the limit steering angle difference Δδlim is zero, that is, when the steering angle δ is an angle between the left limit steering angle δlim_L and the right limit steering angle δlim_R. The limit steering angle assist steering force Fδlim output by the function Kintr is larger than zero and increases as the limit steering angle difference Δδlim increases when the limit steering angle difference Δδlim is larger than zero, that is, when the steering angle δ is an angle counterclockwise from the left limit steering angle δlim_L or clockwise from the right limit steering angle δlim_R.

Although the present disclosure is not limited, the vehicle driving assist device 10 may set an upper limit value of the assist steering force to be applied to the steering wheel 31 (upper limit assist steering force Fupper) and, when the limit steering angle assist steering force Fδlim acquired according to Equation 4 is larger than the upper limit assist steering force Fupper, limit the limit steering angle assist steering force Fδlim to the upper limit assist steering force Fupper, that is, set the upper limit assist steering force Fupper as the limit steering angle assist steering force Fδlim.

Next, the vehicle driving assist device 10 advances the process to step S225, and sets the limit steering angle assist steering force Fδlim acquired in step S220 as a target assist steering force Ftgt.

Next, the vehicle driving assist device 10 advances the process to step S230, and applies an assist steering force corresponding to the target assist steering force Ftgt set in step S225 to the steering wheel 31. Then, the vehicle driving assist device 10 advances the process to step S295, and temporarily terminates the process of the current routine.

When the steering angle δ is an angle between the left limit steering angle δlim_L and the right limit steering angle δlim_R, the assist steering force applied to the steering wheel 31 is zero. In other words, when the steering angle δ does not exceed the left limit steering angle δlim_L counterclockwise and does not exceed the right limit steering angle δlim_R clockwise, the assist steering force applied to the steering wheel 31 is zero.

When the steering angle δ is an angle counterclockwise from the left limit steering angle δlim_L, the assist steering force applied to the steering wheel 31 is a clockwise steering force larger than zero. In other words, when the steering angle δ exceeds the left limit steering angle δlim_L counterclockwise, the assist steering force applied to the steering wheel 31 is the clockwise steering force larger than zero.

When the steering angle δ is an angle clockwise from the right limit steering angle δlim_R, the assist steering force applied to the steering wheel 31 is a counterclockwise steering force larger than zero. In other words, when the steering angle δ exceeds the right limit steering angle δlim_R clockwise, the assist steering force applied to the steering wheel 31 is the counterclockwise steering force larger than zero.

In this way, the vehicle driving assist device 10 does not apply the clockwise assist steering force to the steering operation (steering wheel operation) when the steering angle δ does not exceed the left limit steering angle δlim_L counterclockwise, and does not apply the counterclockwise assist steering force to the steering operation (steering wheel operation) when the steering angle δ does not exceed the right limit steering angle δlim_R clockwise.

When the steering angle δ exceeds the left limit steering angle δlim_L counterclockwise, the vehicle driving assist device 10 applies, to the steering operation (steering wheel operation), the clockwise assist steering force that increases as the difference between the steering angle δ and the left limit steering angle δlim_L (limit steering angle difference Δδlim) increases. When the steering angle δ exceeds the right limit steering angle δlim_R clockwise, the vehicle driving assist device 10 applies, to the steering operation (steering wheel operation), the counterclockwise assist steering force that increases as the difference between the steering angle δ and the right limit steering angle δlim_R (limit steering angle difference Δδlim) increases.

With the vehicle driving assist device 10, the assist steering force to be applied to the steering wheel 31 is determined based on the limit steering angle δlim. The limit steering angle δlim is determined based on the traveling conditions of the target vehicle 100 and the positional relationship between the target vehicle 100 and at least one of the left traveling road boundary MB_L and the right traveling road boundary MB_R. Therefore, the assist steering force to be applied to the steering wheel 31 can be determined when at least one of the left traveling road boundary MB_L and the right traveling road boundary MB_R can be set and the traveling conditions of the target vehicle 100 can be detected. Therefore, the assist steering force can be applied to the steering wheel 31 even if one of the left traveling road boundary MB_L and the right traveling road boundary MB_R cannot be set.

With the vehicle driving assist device 10, the assist steering force can be applied to the steering wheel 31 as described below.

Figure 7A:
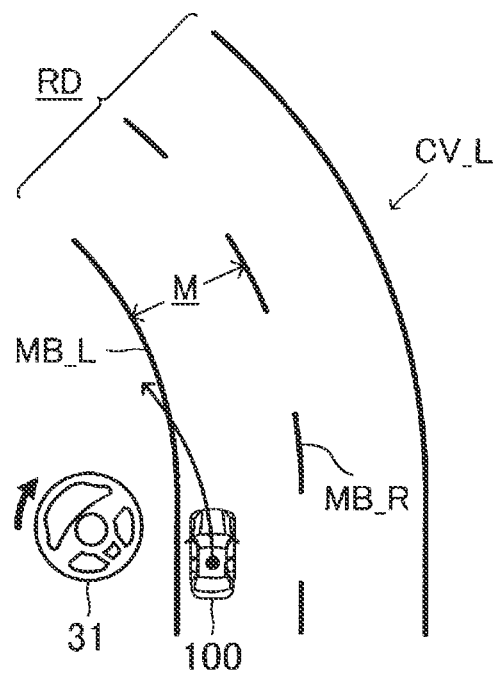
FIG. 7A is a diagram showing a situation where the target vehicle reaches the entrance of a leftward curved road.
Figure 7B:
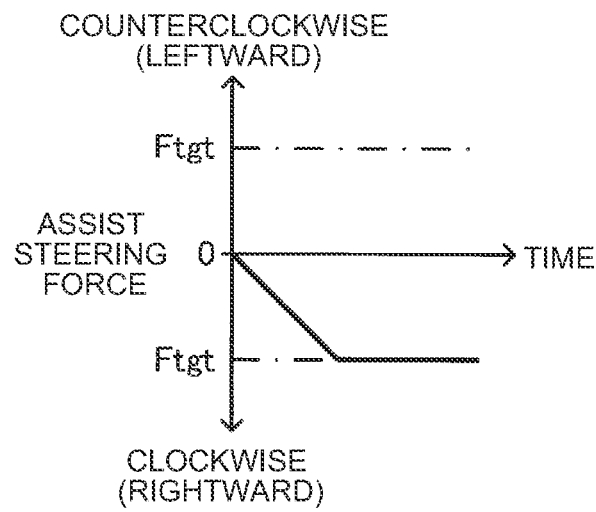
FIG. 7B is a diagram showing an assist steering force in the situation shown in FIG. 7A.

For example, when the target vehicle 100 reaches the entrance of a leftward curved road CV_L (road curved to the left) with one lane on each side and is near a left side of a traveling road M as shown in FIG. 7A, the target vehicle 100 may deviate leftward from the traveling road M if the driver excessively operates the steering wheel 31 counterclockwise. With the vehicle driving assist device 10, a clockwise assist steering force is applied to the steering wheel 31 at this time as shown in FIG. 7B. Therefore, it is difficult for the driver to operate the steering wheel 31 counterclockwise. Thus, it is possible to suppress the leftward deviation of the target vehicle 100 from the traveling road M.

Figure 7C:
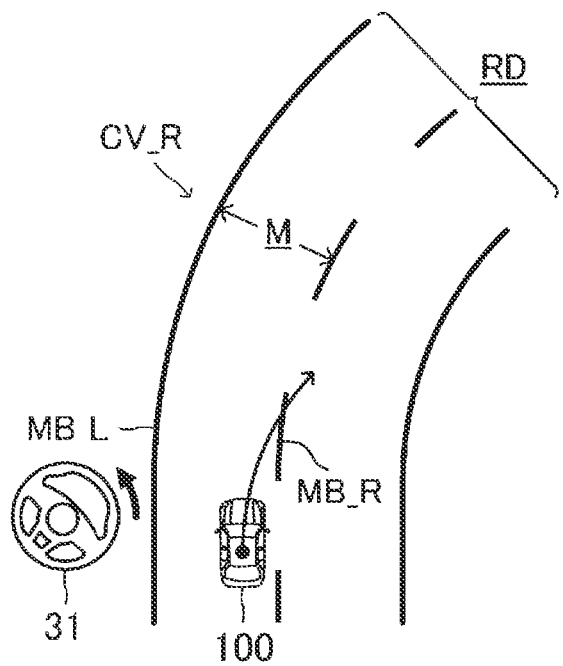
FIG. 7C is a diagram showing a situation where the target vehicle reaches the entrance of a rightward curved road.
Figure 7D:
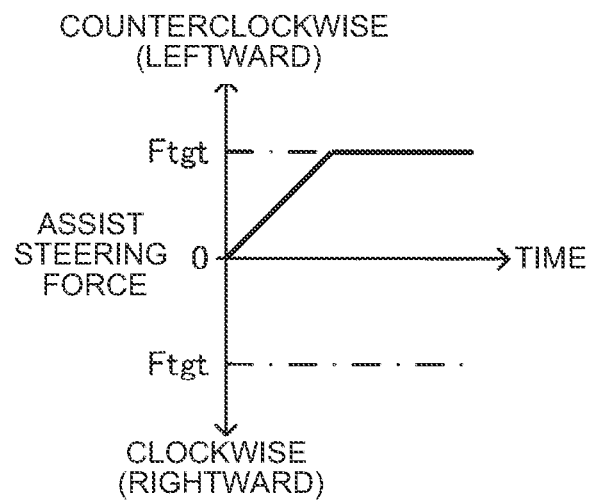
FIG. 7D is a diagram showing an assist steering force in the situation shown in FIG. 7C

Similarly, when the target vehicle 100 reaches the entrance of a rightward curved road CV_R (road curved to the right) with one lane on each side and is near a right side of a traveling road M as shown in FIG. 7C, the target vehicle 100 may deviate rightward from the traveling road M if the driver excessively operates the steering wheel 31 clockwise. With the vehicle driving assist device 10, a counterclockwise assist steering force is applied to the steering wheel 31 at this time as shown in FIG. 7D. Therefore, it is difficult for the driver to operate the steering wheel 31 clockwise. Thus, it is possible to suppress the rightward deviation of the target vehicle 100 from the traveling road M.

Figure 8A:
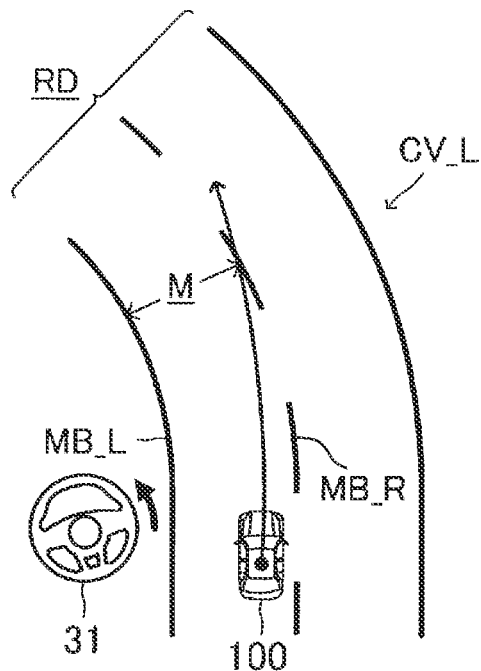
FIG. 8A is a diagram showing a situation where the target vehicle reaches the entrance of the leftward curved road.
Figure 8B:
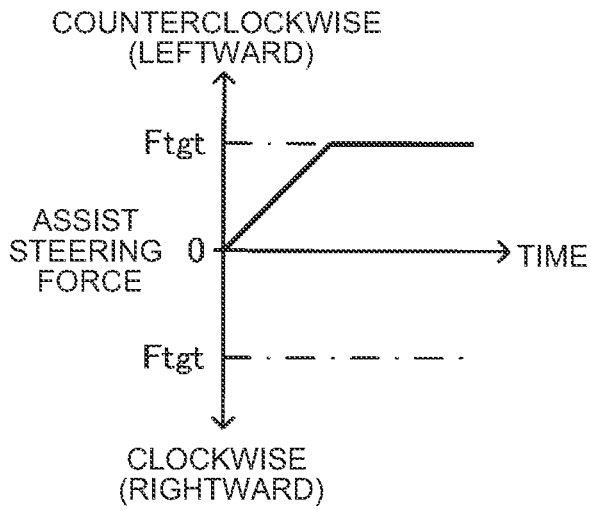
FIG. 8B is a diagram showing an assist steering force in the situation shown in FIG. 8A

When the target vehicle 100 reaches the entrance of the leftward curved road CV_L with one lane on each side and is conversely near a right side of the traveling road M as shown in FIG. 8A, the target vehicle 100 may deviate rightward from the traveling road M if the driver operates the steering wheel 31 counterclockwise to an excessively low degree. With the vehicle driving assist device 10, a counterclockwise assist steering force is applied to the steering wheel 31 at this time as shown in FIG. 8B. Therefore, it is easy for the driver to operate the steering wheel 31 counterclockwise. Thus, it is possible to suppress the rightward deviation of the target vehicle 100 from the traveling road M.

Figure 8C:
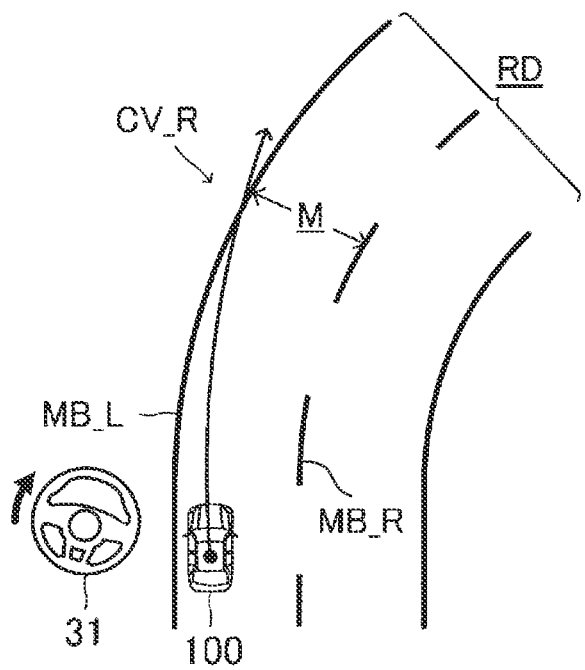
FIG. 8C is a diagram showing a situation where the target vehicle reaches the entrance of the rightward curved road.
Figure 8D:
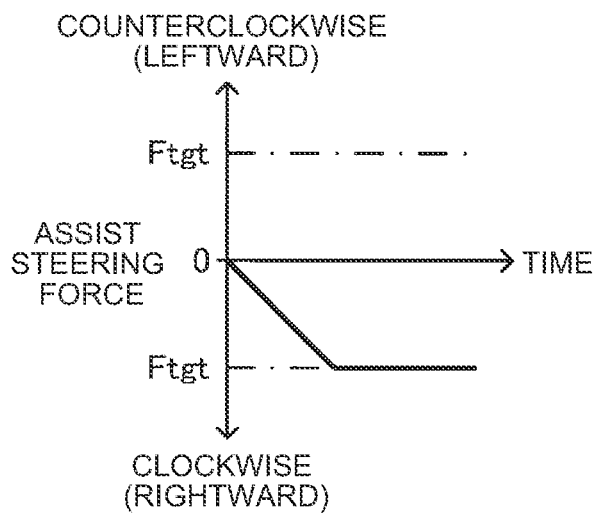
FIG. 8D is a diagram showing an assist steering force in the situation shown in FIG. 8C

Similarly, when the target vehicle 100 reaches the entrance of the rightward curved road CV_R with one lane on each side and is near a left side of the traveling road M as shown in FIG. 8C, the target vehicle 100 may deviate leftward from the traveling road M if the driver operates the steering wheel 31 clockwise to an excessively low degree. With the vehicle driving assist device 10, a clockwise assist steering force is applied to the steering wheel 31 at this time as shown in FIG. 8D. Therefore, it is easy for the driver to operate the steering wheel 31 clockwise. Thus, it is possible to suppress the leftward deviation of the target vehicle 100 from the traveling road M.

Figure 9A:
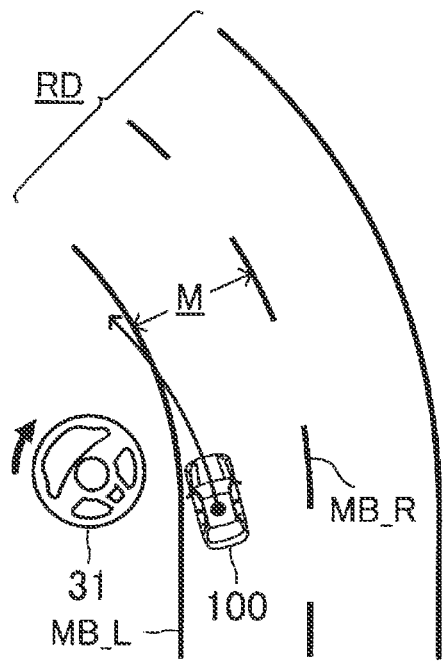
FIG. 9A is a diagram showing a situation where the target vehicle is traveling near a left side on the leftward curved road.
Figure 9B:
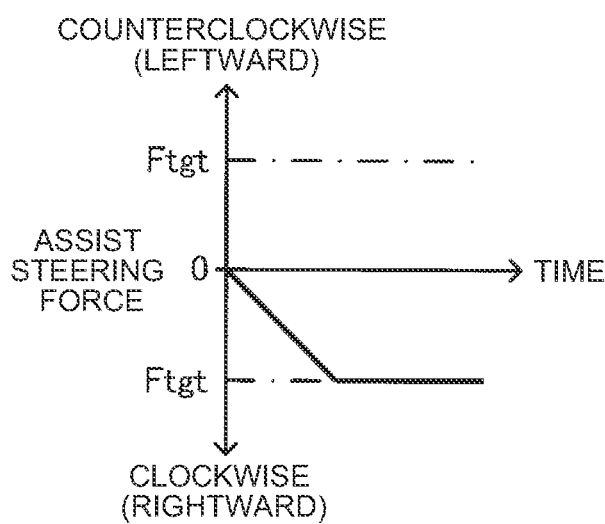
FIG. 9B is a diagram showing an assist steering force in the situation shown in FIG. 9A

When the target vehicle 100 is traveling on the leftward curved road CV_L with one lane on each side and the driver excessively operates the steering wheel 31 counterclockwise while a yaw angle Y of the target vehicle 100 is large in the leftward direction as shown in FIG. 9A, there is a strong possibility that the target vehicle 100 travels toward the left traveling road boundary MB_L and deviates leftward from the traveling road M. With the vehicle driving assist device 10, a clockwise assist steering force is applied to the steering wheel 31 at this time as shown in FIG. 9B. Therefore, it is difficult for the driver to operate the steering wheel 31 counterclockwise. Thus, it is possible to suppress the leftward deviation of the target vehicle 100 from the traveling road M.

The vehicle driving assist device 10 may acquire the yaw angle Y as the traveling condition of the target vehicle 100, and set the limit steering angle Δlim based on the yaw angle Y, the target-vehicle speed V, and the position of the target vehicle 100 with respect to the traveling road boundary MB. In this case, the target vehicle 100 is more likely to approach the traveling road boundary MB as the yaw angle Y of the target vehicle 100 increases. Therefore, the vehicle driving assist device 10 sets the limit steering angle δlim to a smaller value as the yaw angle Y increases. The vehicle driving assist device 10 can acquire the yaw angle Y of the target vehicle 100 based on the camera image information IC.

Figure 9C:
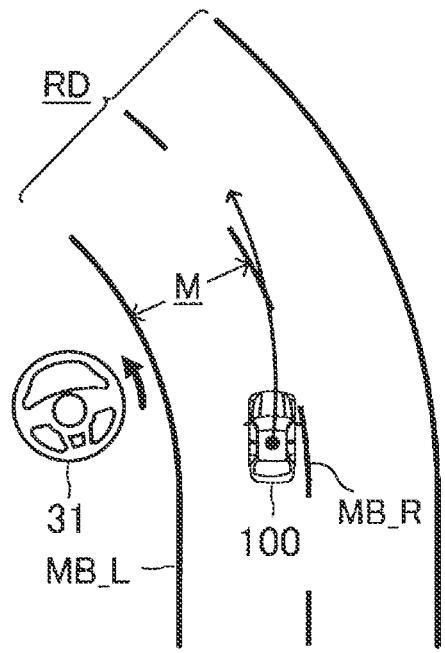
FIG. 9C is a diagram showing a situation where the target vehicle is traveling near a right side on the leftward curved road.
Figure 9D:
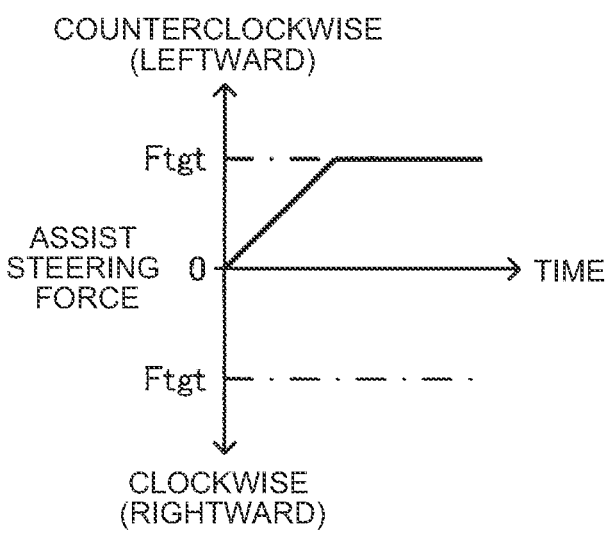
FIG. 9D is a diagram showing an assist steering force in the situation shown in FIG. 9C

When the target vehicle 100 is traveling on the leftward curved road CV_L with one lane on each side and the driver operates the steering wheel 31 counterclockwise to an excessively low degree while the yaw angle Y of the target vehicle 100 is large in the rightward direction as shown in FIG. 9C, there is a strong possibility that the target vehicle 100 travels toward the right traveling road boundary MB_R and deviates rightward from the traveling road M. With the vehicle driving assist device 10, a counterclockwise assist steering force is applied to the steering wheel 31 at this time as shown in FIG. 9D. Therefore, it is easy for the driver to operate the steering wheel 31 counterclockwise. Thus, it is possible to suppress the rightward deviation of the target vehicle 100 from the traveling road M.

Figure 10A:
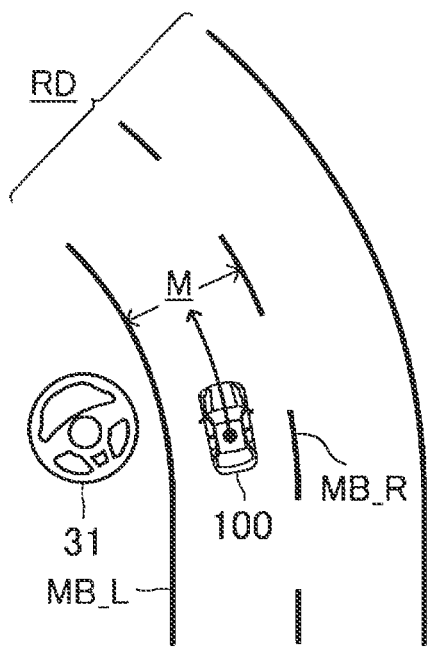
FIG. 10A is a diagram showing a situation where the target vehicle is traveling at the center on the leftward curved road.
Figure 10B:
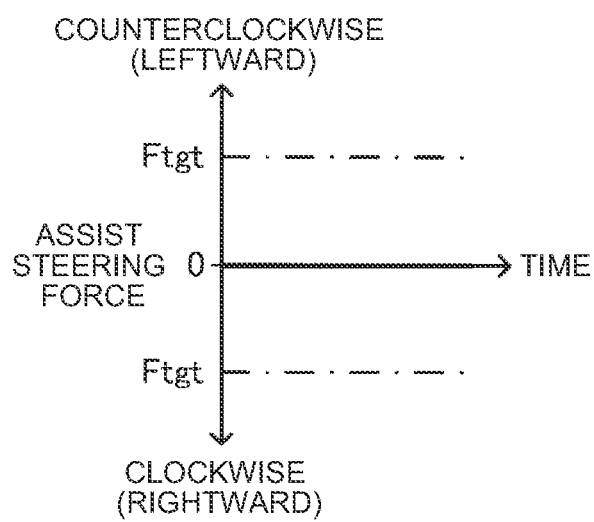
FIG. 10B is a diagram showing an assist steering force in the situation shown in FIG. 10A.

When the target vehicle 100 is traveling on the leftward curved road CV_L with one lane on each side and the driver is appropriately operating the steering wheel 31 counterclockwise as shown in FIG. 10A, the assist steering force applied to the steering wheel 31 by the vehicle driving assist device 10 is zero as shown in FIG. 10B.

Figure 11A:
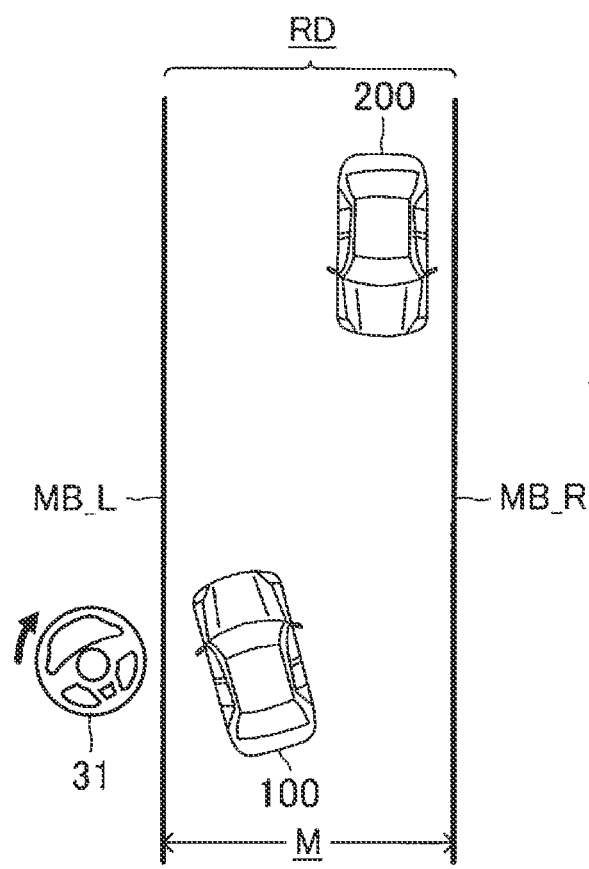
FIG. 11A is a diagram showing a situation where the target vehicle passes by an oncoming vehicle.
Figure 11B:
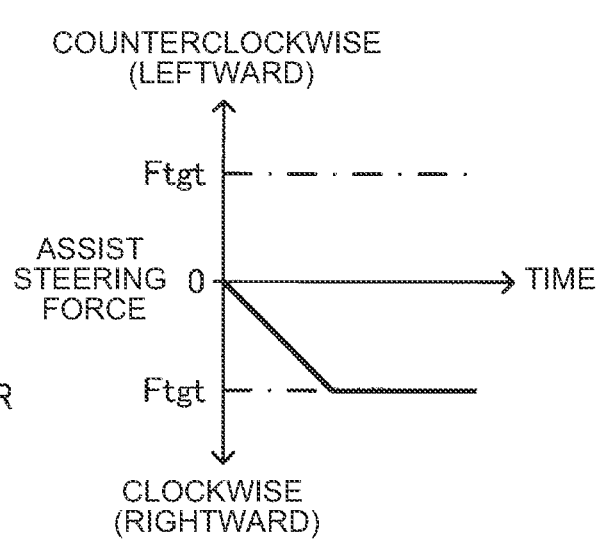
FIG. 11B is a diagram showing an assist steering force in the situation shown in FIG. 11A.

When the driver operates the steering wheel 31 counterclockwise to move the target vehicle 100 to the left side of the traveling road M in order to cause the target vehicle 100 to pass by an oncoming vehicle 200 as shown in FIG. 11A, a clockwise assist steering force is applied to the steering wheel 31 as shown in FIG. 11B. Therefore, it is easy for the driver to operate the steering wheel 31 clockwise. Thus, it is easy for the driver to operate the steering wheel to cause the target vehicle 100 to travel straightforward.

Figure 12A:
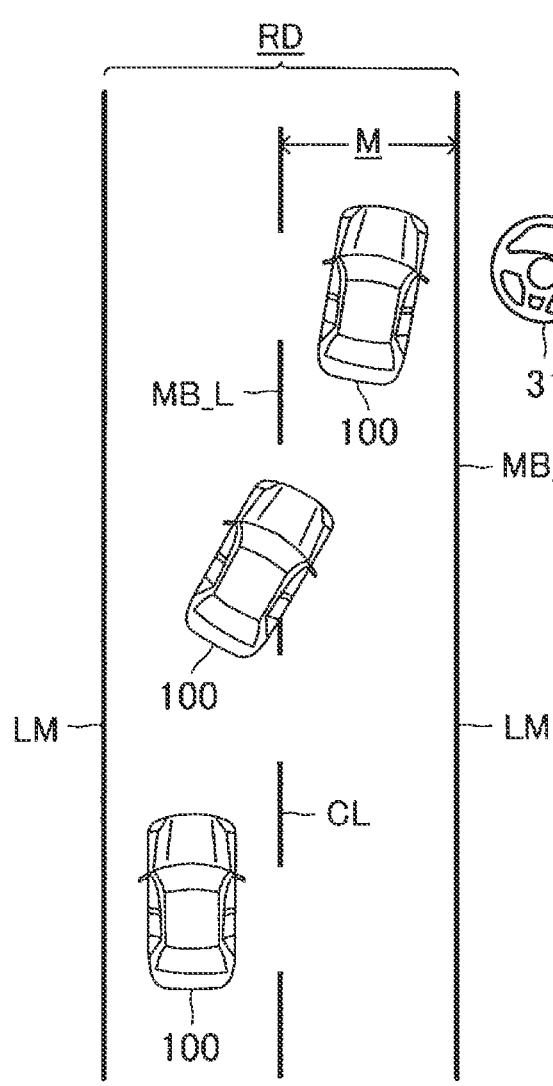
FIG. 12A is a diagram showing a situation where the target vehicle is changing lanes.
Figure 12B:
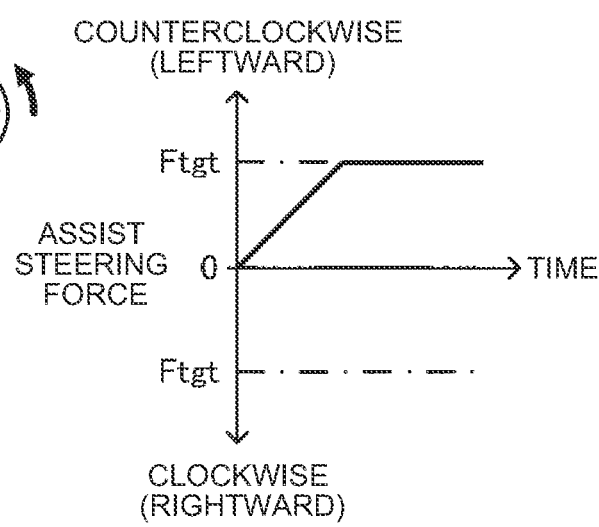
FIG. 12B is a diagram showing an assist steering force in the situation shown in FIG. 12A.

When the driver changes the lane of the target vehicle 100 to the traveling road M adjacent on the right side and causes the target vehicle 100 to enter the adjacent traveling road M as shown in FIG. 12A, a counterclockwise assist steering force is applied to the steering wheel 31 as shown in FIG. 12B. Therefore, it is easy for the driver to operate the steering wheel 31 counterclockwise. Thus, it is easy for the driver to operate the steering wheel to cause the target vehicle 100 to travel straightforward.

Figure 13:
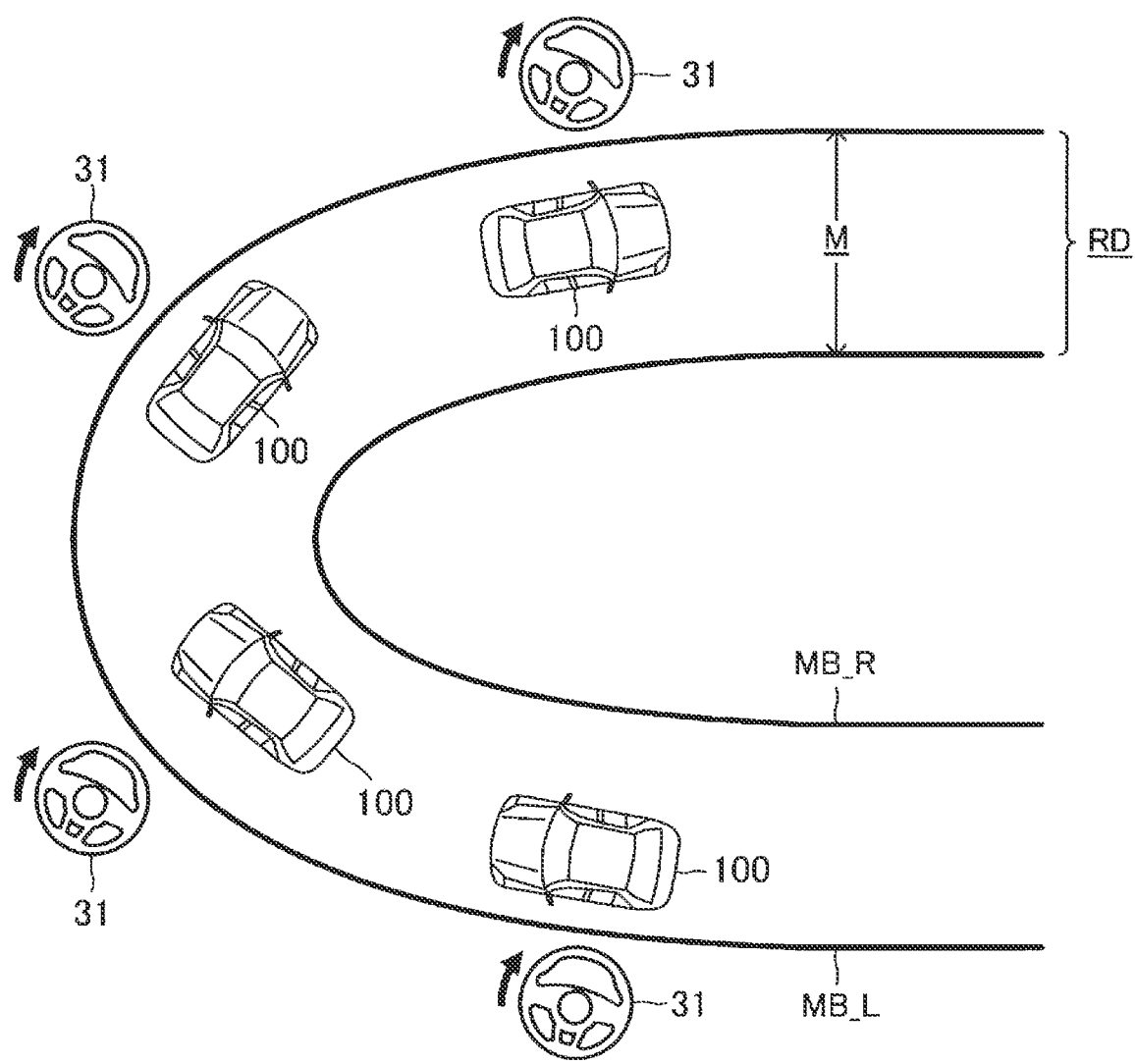
FIG. 13 is a diagram showing a situation where the target vehicle is traveling on a sharply curved road.

When the driver's clockwise steering wheel operation is insufficient while the driver operates the steering wheel to cause the target vehicle 100 to travel on a sharp rightward curved road CV_R as shown in FIG. 13, that is, when the steering angle δ exceeds the left limit steering angle δlim_L counterclockwise, a clockwise assist steering force is applied to the steering wheel 31. Therefore, it is easy for the driver to operate the steering wheel 31 clockwise. Thus, it is easy for the driver to perform the steering wheel operation.

Figure 14:
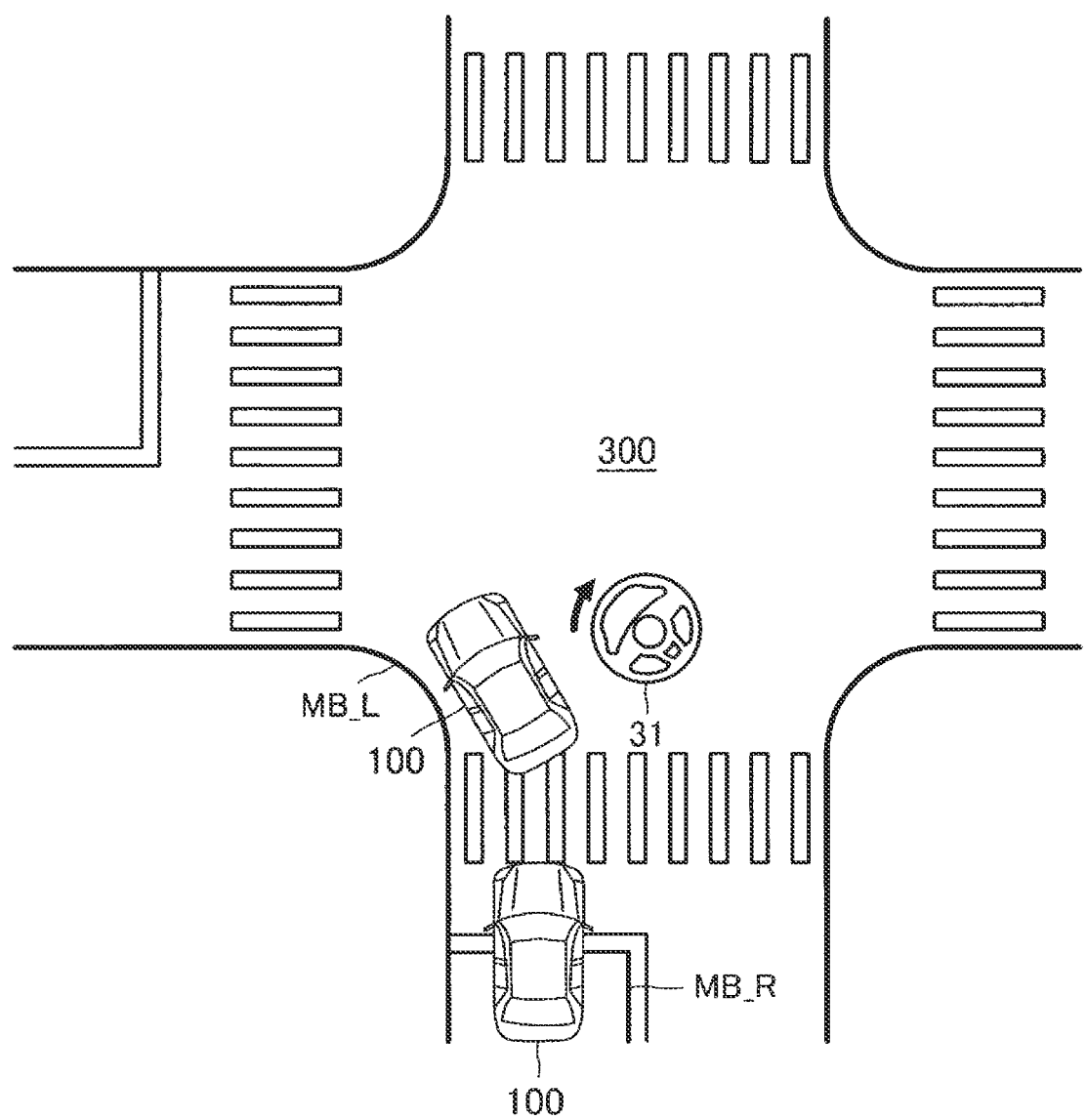
FIG. 14 is a diagram showing a situation where the target vehicle turns left at an intersection.

When the driver operates the steering wheel to cause the target vehicle 100 to turn left at an intersection 300 and the driver's counterclockwise steering wheel operation is excessive though the target vehicle 100 is near the left side as shown in FIG. 14, that is, when the steering angle δ exceeds the left limit steering angle δlim_L counterclockwise, a clockwise assist steering force is applied to the steering wheel 31. Therefore, it is difficult for the driver to operate the steering wheel 31 counterclockwise. Thus, it is possible to suppress the driver's excessive counterclockwise operation on the steering wheel 31. As a result, it is possible to prevent the occurrence of a case where the left rear wheel of the target vehicle 100 runs over a curb etc.

Figure 15:
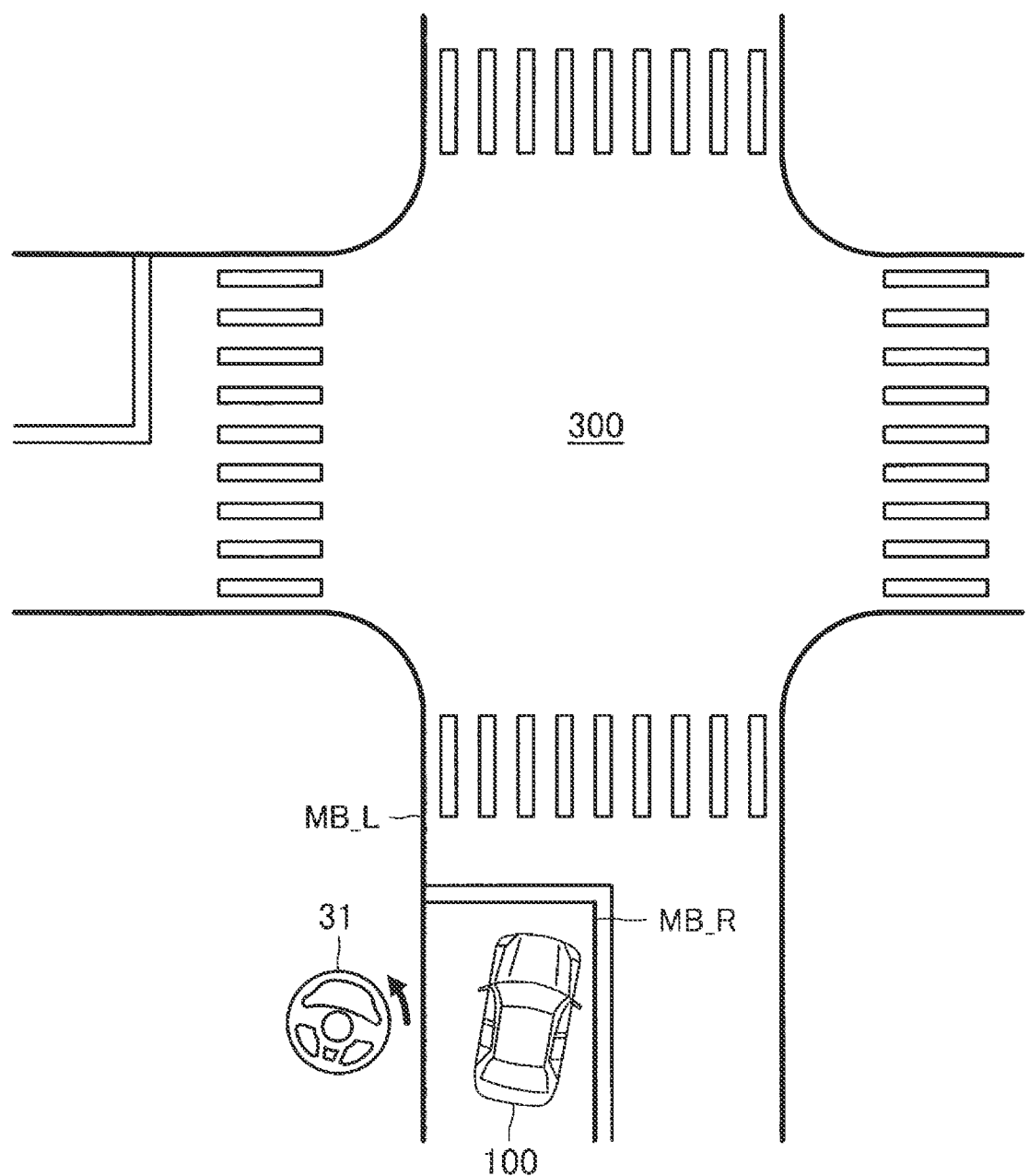
FIG. 15 is a diagram showing a situation where the target vehicle approaches a right side immediately before turning left at the intersection.

When the driver temporarily operates the steering wheel 31 clockwise immediately before the target vehicle 100 turns left at the intersection 300 as shown in FIG. 15, the driver's clockwise steering wheel operation is excessive and the steering angle δ exceeds the right limit steering angle δlim_R clockwise. Therefore, a counterclockwise assist steering force is applied to the steering wheel 31. Therefore, it is difficult for the driver to operate the steering wheel 31 clockwise. Thus, the driver's steering wheel operation can be assisted to cause the target vehicle 100 to travel along an appropriate route and turn left.

Figure 16:
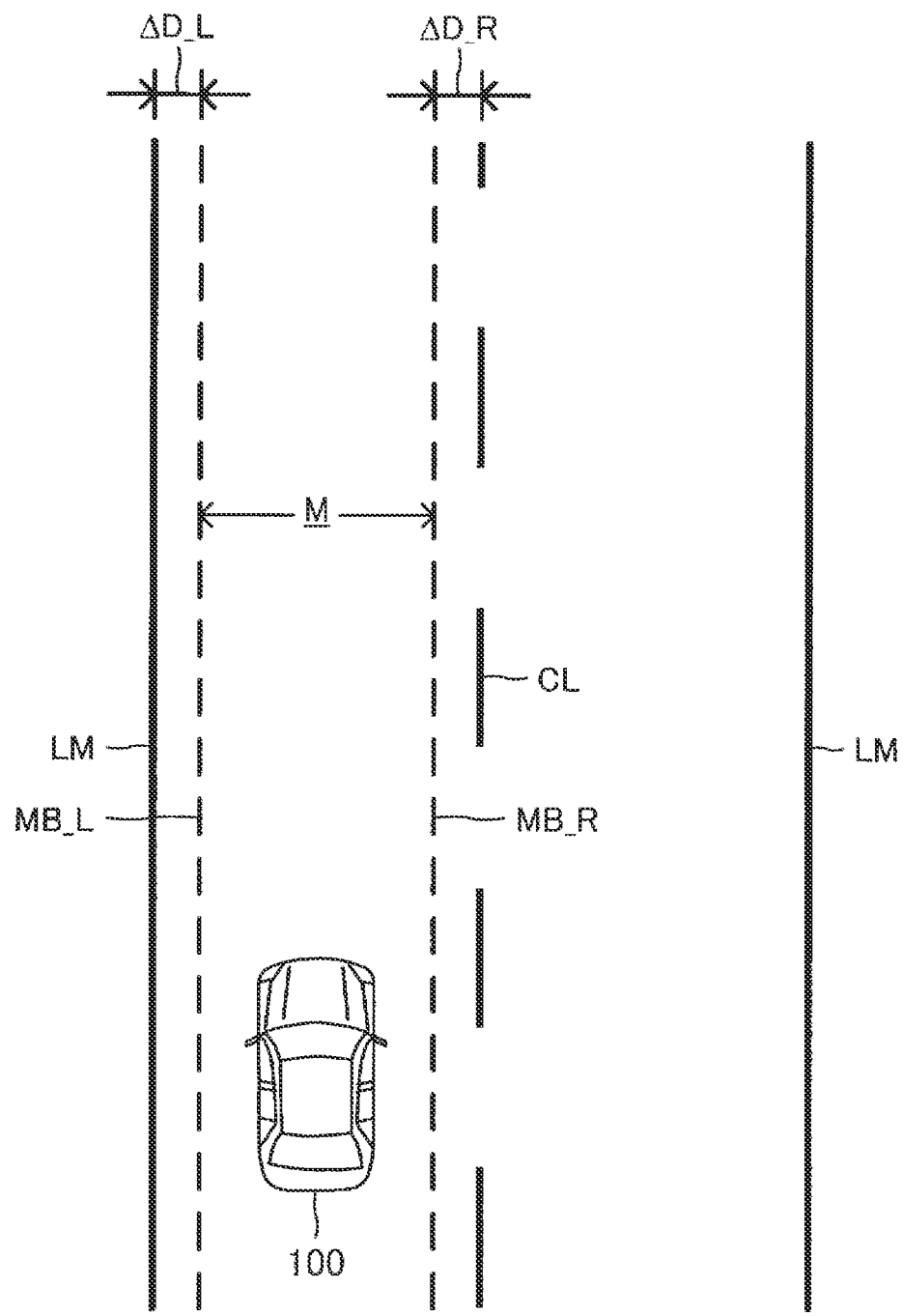
FIG. 16 is a diagram showing traveling road boundaries in a situation where the target vehicle is traveling on a road with one lane on each side and a center line at the center of the road.
Figure 17:
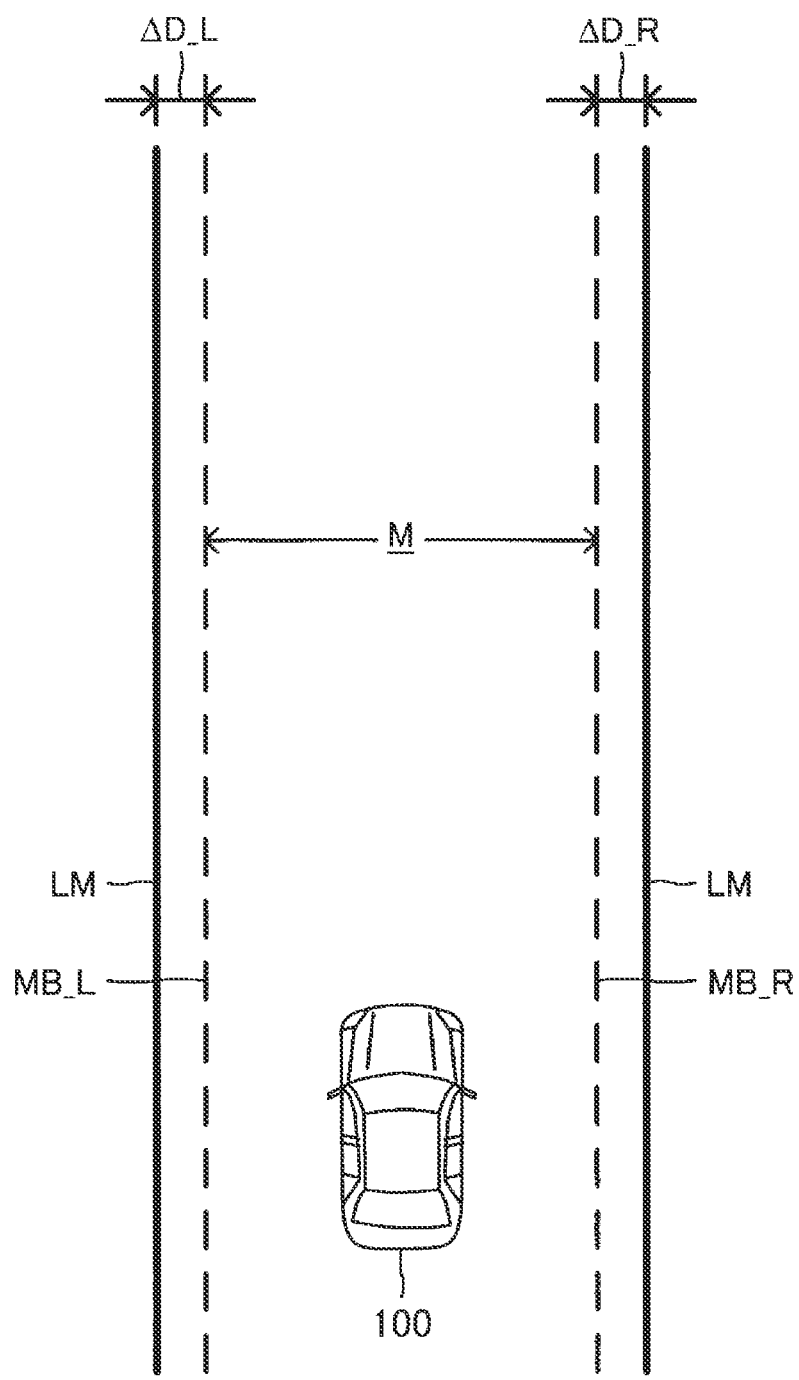
FIG. 17 is a diagram showing traveling road boundaries in a situation where the target vehicle is traveling on a road with no center line at the center of the road.

As described above, the vehicle driving assist device 10 may set, as the traveling road boundaries MB, lines at predetermined distances inward from the lane boundaries LB (toward the center of the lane) as shown in FIGS. 16 and 17.

In the example shown in FIG. 16, the target-vehicle traveling road RD has one lane on each side with the center line CL. Therefore, a line at a predetermined distance ΔD_L rightward from the lane line LM on the left side of the target vehicle 100 is set as the left traveling road boundary MB_L, and a line at a predetermined distance ΔD_R leftward from the center line CL on the right side of the target vehicle 100 is set as the right traveling road boundary MB_R.

In the example shown in FIG. 17, the target-vehicle traveling road RD has no center line CL. Therefore, a line at the predetermined distance ΔD_L rightward from the lane line LM on the left side of the target vehicle 100 is set as the left traveling road boundary MB_L, and a line at the predetermined distance ΔD_R leftward from the lane line LM on the right side of the target vehicle 100 is set as the right traveling road boundary MB_R.

Figure 18:
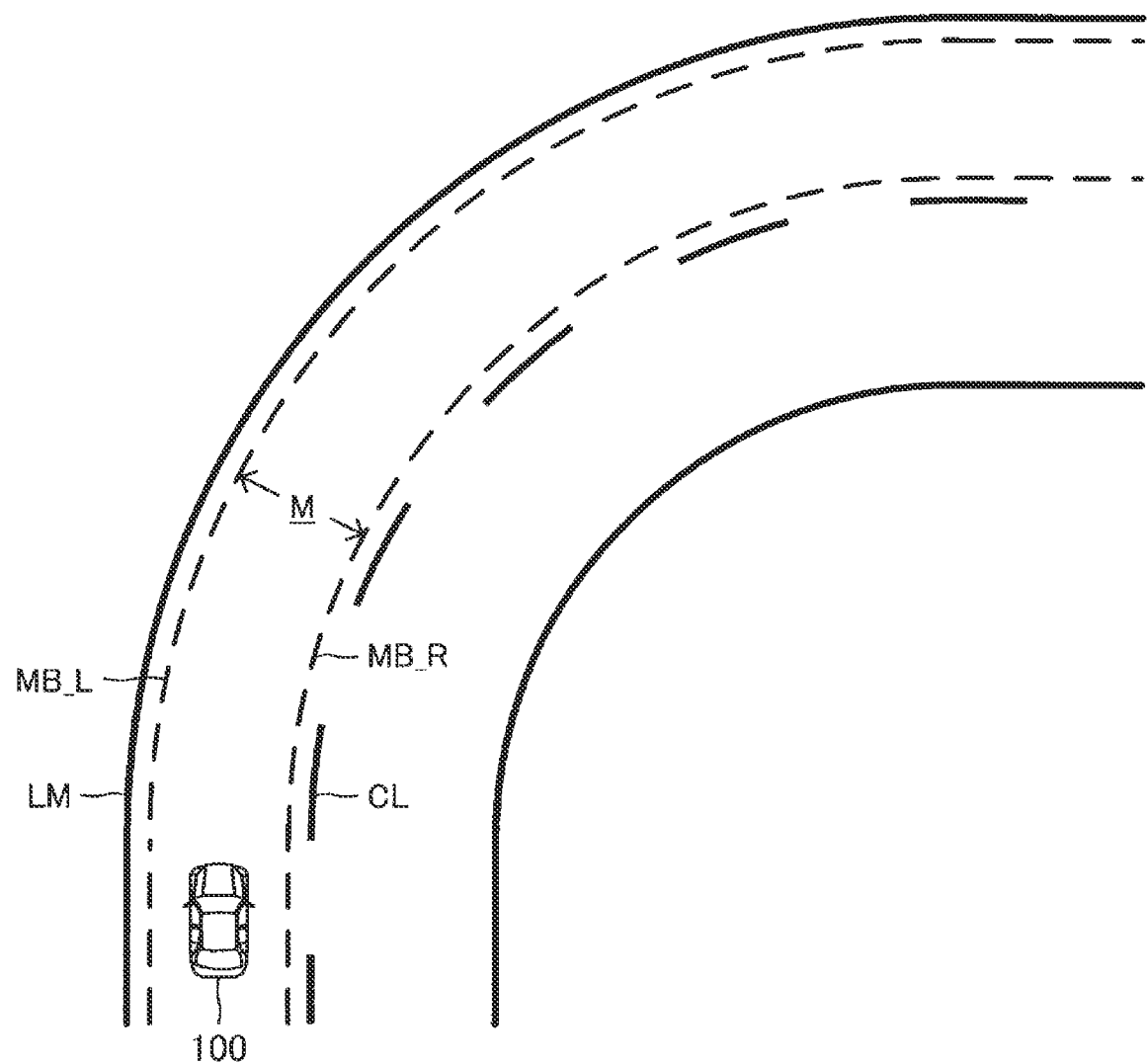
FIG. 18 is a diagram showing one form of traveling road boundaries in a situation where the target vehicle travels on a rightward curved road.

Therefore, when the target vehicle 100 travels on the rightward curved road CV_R having one lane on each side with the center line CL, the traveling road boundaries MB are as shown in FIG. 18. That is, the line at the predetermined distance ΔD_L rightward from the lane line LM on the left side of the target vehicle 100 is set as the left traveling road boundary MB_L, and the line at the predetermined distance ΔD_R leftward from the center line CL on the right side of the target vehicle 100 is set as the right traveling road boundary MB_R.

Although the predetermined distance ΔD_L for setting the left traveling road boundary MB_L and the predetermined distance ΔD_R for setting the right traveling road boundary MB_R may be the same value, they may be different values depending on the situation around the target vehicle 100.

For example, when the target vehicle 100 is traveling on a road with no center line CL and the laws etc. require the target vehicle 100 to travel on the left side of the road, the predetermined distance ΔD_R for setting the right traveling road boundary MB_R may be set to a larger value than the predetermined distance ΔD_L for setting the left traveling road boundary MB_L.

The vehicle driving assist device 10 may set the traveling road boundaries MB based on the lane boundaries LB that define the lane where the target vehicle 100 is traveling (target-vehicle traveling lane LN) and forward road environment information IF on an environment of a road ahead of the target vehicle 100.

In this example, the forward road environment information IF is information indicating that the road where the target vehicle 100 is traveling (target-vehicle traveling road RD) is a curved road, or information indicating that an obstacle is present on a road ahead of the target vehicle 100. In particular, the obstacle is an oncoming vehicle or another stopped vehicle.

For example, the vehicle driving assist device 10 may be configured to acquire, as the forward road environment information IF, information indicating that the road where the target vehicle 100 is traveling (target-vehicle traveling road RD) is a curved road. When the information indicating that the road where the target vehicle 100 is traveling (target-vehicle traveling road RD) is a curved road is acquired as the forward road environment information IF, the vehicle driving assist device 10 may set the traveling road boundaries MB to increase a turning radius of the target vehicle 100 while the target vehicle 100 is traveling on the curved road.

In other words, when the vehicle driving assist device 10 is configured to acquire, as the forward road environment information IF, information indicating that the road where the target vehicle 100 is traveling (target-vehicle traveling road RD) is a curved road, the vehicle driving assist device 10 may set the traveling road boundaries MB to cause the target vehicle 100 to enter the curved road CV from a side closer to a lane boundary LB on an outer side of turning than a lane boundary LB on an inner side of turning out of the lane boundaries LB that define the lane where the target vehicle 100 is traveling (target-vehicle traveling lane LN), travel away from the lane boundary LB on the outer side of turning and closer to the lane boundary LB on the inner side of turning, travel away from the lane boundary LB on the inner side of turning and closer to the lane boundary LB on the outer side of turning, and exit the curved road CV from a side closer to the lane boundary LB on the outer side of turning.

Figure 19:
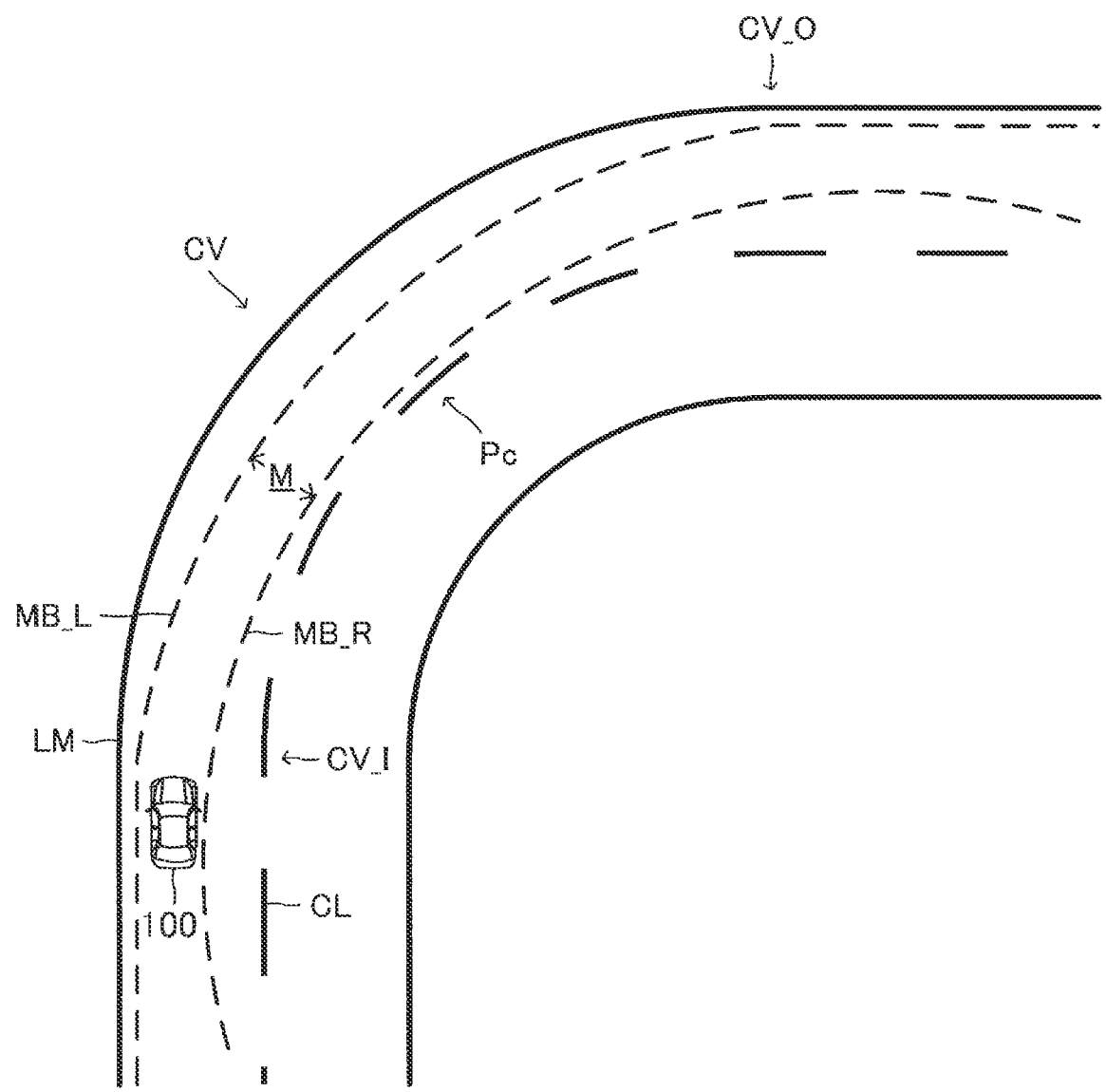
FIG. 19 is a diagram showing another form of traveling road boundaries in the situation where the target vehicle travels on the rightward curved road.

For example, when the target vehicle 100 travels on the rightward curved road CV_R having one lane on each side with the center line CL as shown in FIG. 19, the vehicle driving assist device 10 may gradually increase the predetermined distance ΔD_R (right predetermined distance ΔD_R) that defines the right traveling road boundary MB_R from a point behind an entrance CV_I of the rightward curved road CV_R, gradually reduce the predetermined distance ΔD_R as the target vehicle 100 travels from the entrance of the rightward curved road CV_R toward a central point Pc of the rightward curved road CV_R, gradually increase the predetermined distance ΔD_R as the target vehicle 100 travels toward an exit CV_O of the rightward curved road CV_R, and gradually reduce the predetermined distance ΔD_R from a point past the exit of the rightward curved road CV_R. In this case, the vehicle driving assist device 10 may maintain the predetermined distance ΔD_L (left predetermined distance ΔD_L) that defines the left traveling road boundary MB_L at a constant value from the point behind the entrance CV_I of the rightward curved road CV_R up to the entrance CV_I, gradually increase the predetermined distance ΔD_L as the target vehicle 100 travels from the entrance of the rightward curved road CV_R toward the central point Pc of the rightward curved road CV_R, gradually reduce the predetermined distance ΔD_L as the target vehicle 100 travels toward the exit CV_O of the rightward curved road CV_R, and maintain the predetermined distance ΔD_L at the constant value from the point past the exit of the rightward curved road CV_R.

When setting the traveling road boundaries MB in this way, the vehicle driving assist device 10 may, for example, learn positions in the lane where the driver of the target vehicle 100 drives the target vehicle 100 based on past driving data (driving history) of the driver, and set appropriate traveling road boundaries as the traveling road boundaries MB based on a result of the learning. Alternatively, the vehicle driving assist device 10 may learn positions in the lane where a suitable driver (e.g., a skilled driver) other than the driver of the target vehicle 100 drives a vehicle based on past driving data (driving history) of the suitable driver, and set appropriate traveling road boundaries as the traveling road boundaries MB based on a result of the learning. The vehicle driving assist device 10 may perform such learning by using an artificial intelligence (AI) technology such as so-called machine learning or deep learning.

The vehicle driving assist device 10 may be configured to acquire, as the forward road environment information IF, information indicating that an obstacle is present on a road ahead of the target vehicle 100. When information indicating that an obstacle is present ahead of the target vehicle 100 is acquired as the forward road environment information IF, the vehicle driving assist device 10 may set the traveling road boundaries MB to define the traveling road of the target vehicle 100 off the obstacle.

Figure 20A:
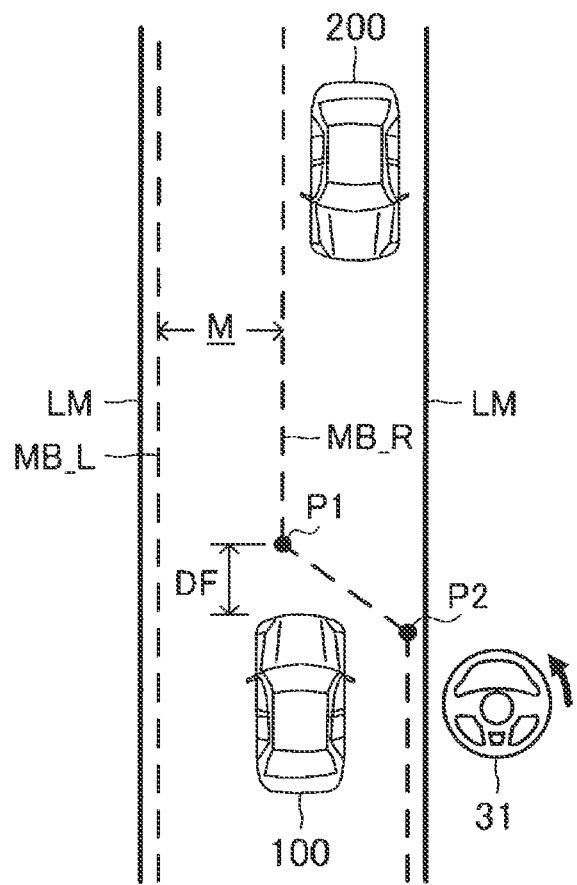
FIG. 20A is a diagram showing traveling road boundaries in a situation where the target vehicle passes by an oncoming vehicle.

For example, when the target-vehicle traveling road RD has no center line CL and the oncoming vehicle 200 approaches the target vehicle 100 from a point ahead of the target vehicle 100 or another vehicle is stopped on the right side ahead of the target vehicle 100 as shown in FIG. 20A, the vehicle driving assist device 10 may set the traveling road boundaries MB based on a positional relationship between the target vehicle 100 and the oncoming vehicle 200 or the other vehicle.

In this example, when the distance between the target vehicle 100 and the oncoming vehicle 200 decreases to a predetermined distance (predetermined oncoming vehicle distance DO), the vehicle driving assist device 10 sets, as the traveling road boundary MB, a line at the center of the target-vehicle traveling road RD ahead of a point P1 located between the target vehicle 100 and the oncoming vehicle 200 away from the target vehicle 100 by a predetermined distance ahead (predetermined forward distance DF), and sets, as the traveling road boundary MB, an oblique line extending between the target vehicle 100 and the oncoming vehicle 200 and connecting the point P1 and a point P2 on a traveling road boundary MB immediately on the right side of a right corner 100R of the target vehicle 100.

Figure 20B:
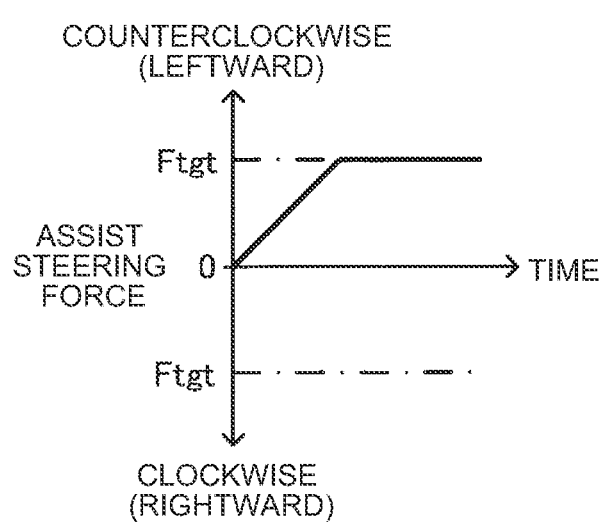
FIG. 20B is a diagram showing an assist steering force in the situation shown in FIG. 20A.

With this setting, a counterclockwise assist steering force is applied to the steering wheel 31 as shown in FIG. 20B because the steering angle δ exceeds the right limit steering angle δlim_R clockwise when the target vehicle 100 approaches the traveling road boundary MB on the oblique line. Therefore, the driver can easily steer the target vehicle 100 off the oncoming vehicle 200.

In order to improve the feeling of the steering wheel operation performed by the driver, a clockwise steering reaction force (normal steering reaction force RFnor) is generally applied to the steering wheel 31 when the steering wheel 31 is operated counterclockwise, and a counterclockwise steering reaction force (normal steering reaction force RFnor) is generally applied to the steering wheel 31 when the steering wheel 31 is operated clockwise. Therefore, when the normal steering reaction force RFnor is applied to the steering wheel 31 in this way, the vehicle driving assist device 10 may set, as the target assist steering force Ftgt, a value obtained by summing the normal steering reaction force RFnor and the limit steering angle assist steering force Fδlim described above (Ftgt=RFnor+Fδlim). Alternatively, the vehicle driving assist device 10 may set the acquired limit steering angle assist steering force Fδlim as the target assist steering force Ftgt when the limit steering angle assist steering force Fδlim is larger than the normal steering reaction force RFnor. In this case, the vehicle driving assist device 10 sets the normal steering reaction force RFnor as the target assist steering force Ftgt when the acquired limit steering angle assist steering force Fδlim is equal to or smaller than the normal steering reaction force RFnor.

The present disclosure is not limited to the embodiment described above, and a variety of modifications can be adopted within the scope of the present disclosure.

First Modification

For example, when the target vehicle 100 travels along a curved road, the vehicle driving assist device 10 may acquire a guide steering angle steering reaction force RFguide described below, and set, as the target assist steering force Ftgt, a value obtained by adjusting the guide steering angle steering reaction force RFguide by using the limit steering angle assist steering force Fδlim described above. Herein-after, the vehicle driving assist device 10 according to the first modification will be described in detail.

Figure 21:
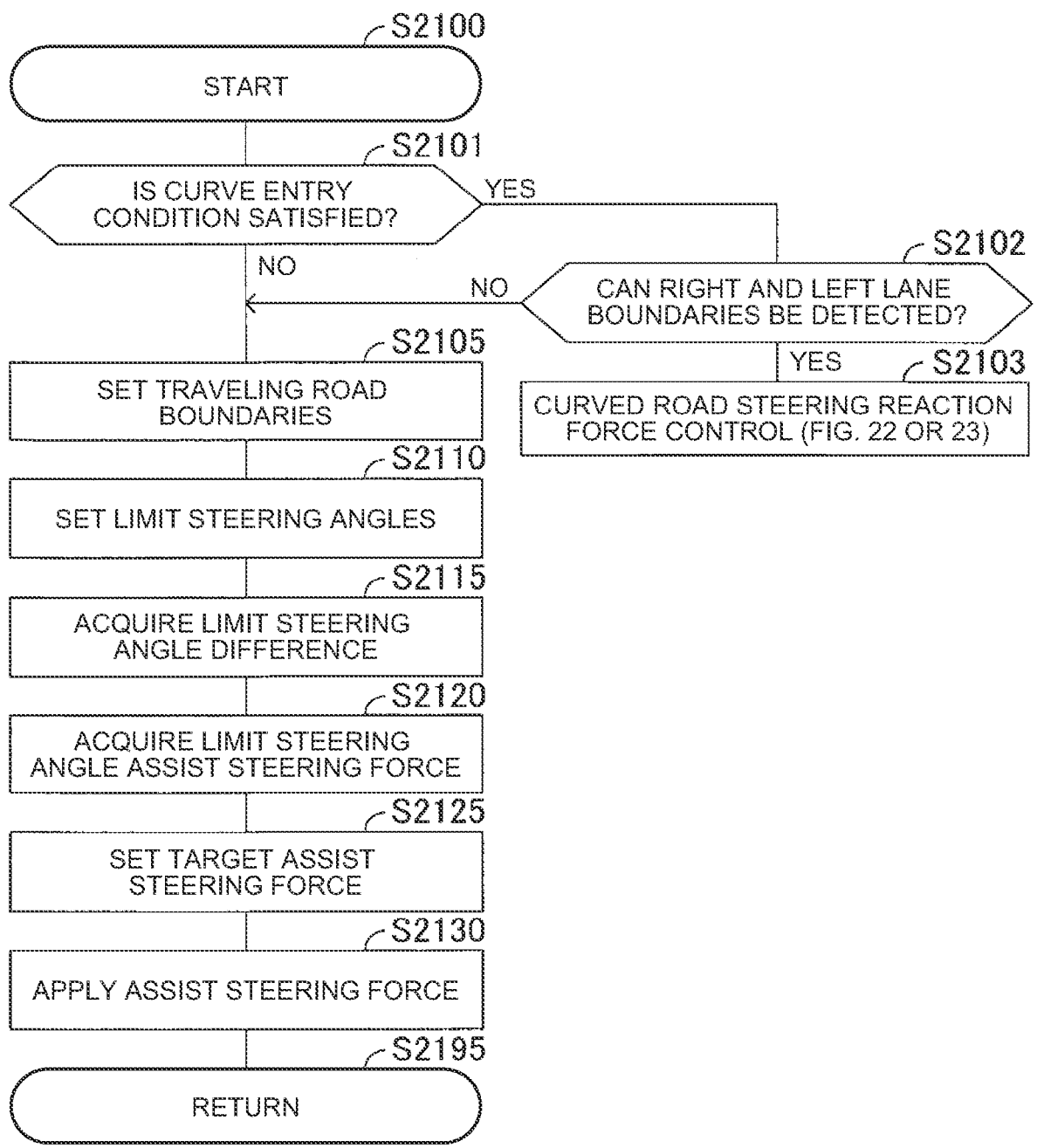
FIG. 21 is a flowchart showing a routine to be executed by the vehicle driving assist device according to a first modification of the embodiment of the present disclosure.

The vehicle driving assist device 10 according to the first modification executes a routine shown in FIG. 21 at a predetermined calculation cycle instead of the routine shown in FIG. 2. At a predetermined timing, the vehicle driving assist device 10 starts a process from step S2100, and advances the process to step S2101 to determine whether a curve entry condition CC is satisfied.

The curve entry condition CC is a condition that a curved road that the target vehicle 100 is predicted to enter within a predetermined period (entry-predicted curved road) is detected. Therefore, the curve entry condition CC is satisfied when the entry-predicted curved road is detected, and is then unsatisfied when the target vehicle 100 finishes traveling on the entry-predicted curved road. Thus, the curve entry condition CC is satisfied while the target vehicle 100 is traveling on the entry-predicted curved road after the entry-predicted curved road is detected, and is unsatisfied otherwise. The vehicle driving assist device 10 may determine whether the curve entry condition CC is satisfied based on the camera image information IC or based on a position (current position P100) of the target vehicle 100 determined from a GPS signal and map information in the map information database 62.

When driving the target vehicle 100 along the curved road, the driver rotates the steering wheel 31. When driving the target vehicle 100 along a sharply curved road, the driver needs to rotate the steering wheel 31 more quickly than when driving the target vehicle 100 along a gently curved road. If the steering reaction force to be applied to the steering wheel operation is constant between the case where the target vehicle 100 travels along a sharply curved road and the case where the target vehicle 100 travels along a gently curved road, there is a possibility that the steering wheel operation delays when the target vehicle 100 travels along the sharply curved road and the target vehicle 100 cannot smoothly travel along the curved road.

In view of the above, the vehicle driving assist device 10 adjusts the steering reaction force based on a curvature of a curved road where the driver intends to drive the target vehicle 100 so that the driver can smoothly drive the target vehicle 100 along the curved road.

For this purpose, the vehicle driving assist device 10 determines in step S2101 whether the curve entry condition CC is satisfied.

When the determination result is "No" in step S2101, the vehicle driving assist device 10 advances the process to step S2105, and executes the process from step S2105 to step S2130. The process from step S2105 to step S2130 is the same as the process from step S205 to step S230 in the routine shown in FIG. 2.

When the determination result is "Yes" in step S2101, the vehicle driving assist device 10 advances the process to step S2102, and determines whether right and left lane lines that define the target-vehicle traveling lane LN can be detected from the camera image information IC.

When the determination result is "No" in step S2102, the vehicle driving assist device 10 advances the process to step S2105, and executes the process from step S2105 to step S2130. As described above, the process from step S2105 to step S2130 is the same as the process from step S205 to step S230 in the routine shown in FIG. 2.

Figure 22:
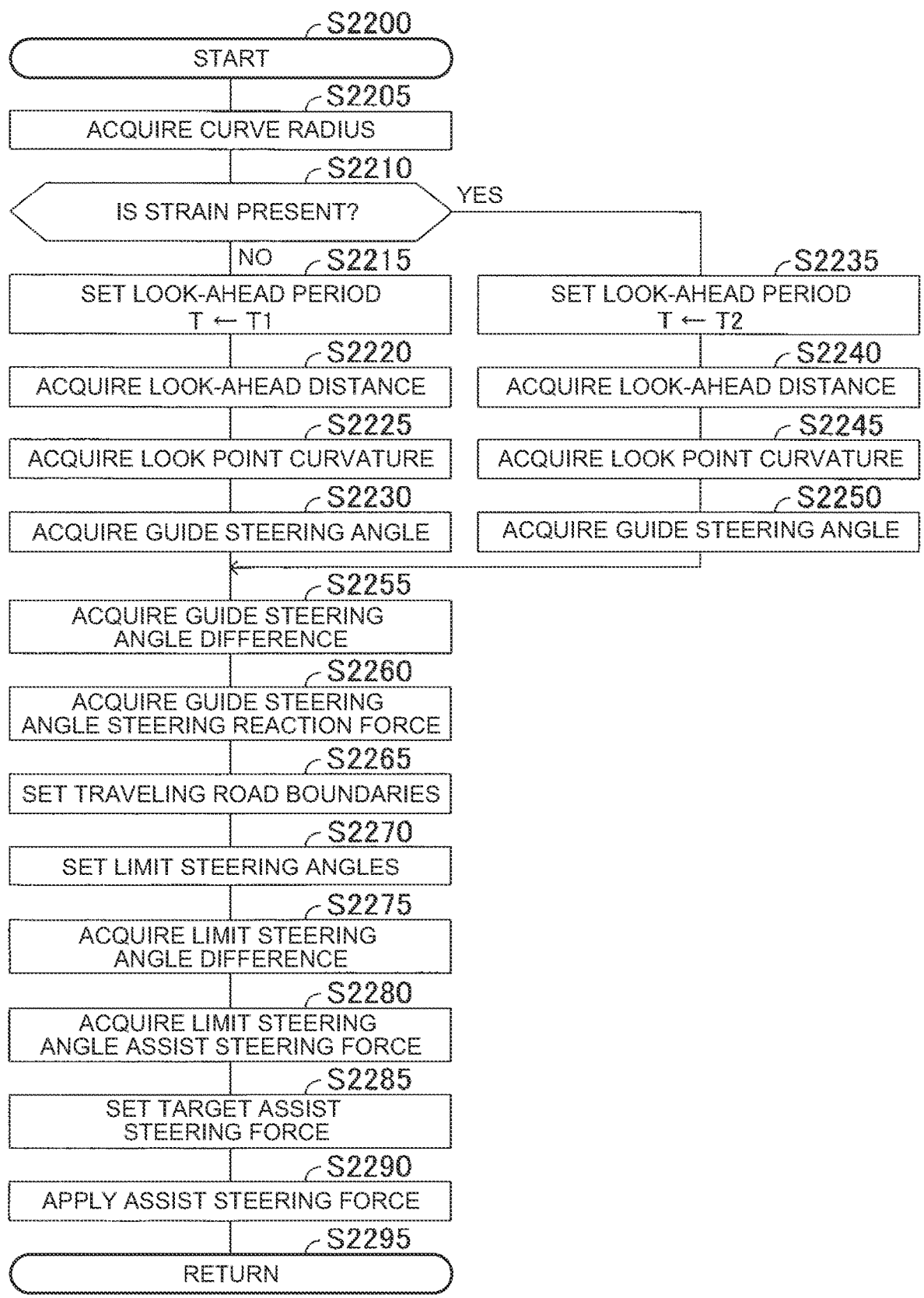
FIG. 22 is a flowchart showing a routine to be executed by the vehicle driving assist device according to the first modification of the embodiment of the present disclosure.
Figure 23:
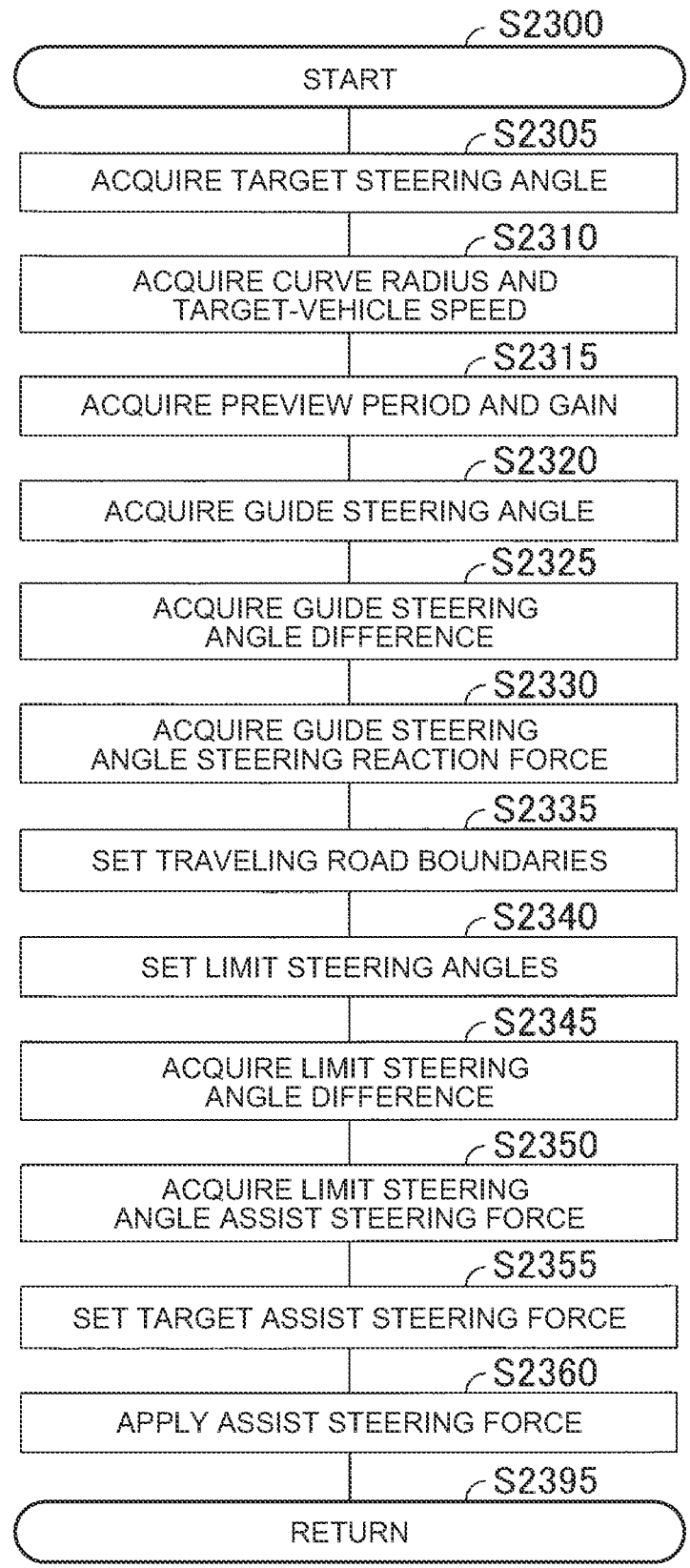
FIG. 23 is a flowchart showing a routine to be executed by the vehicle driving assist device according to the first modification of the embodiment of the present disclosure.

When the determination result is "Yes" in step S2102, the vehicle driving assist device 10 advances the process to step S2103, and executes a routine shown in FIG. 22 or 23. When the vehicle driving assist device 10 is configured to execute the routine shown in FIG. 22 and advances the process to step S2103, the vehicle driving assist device 10 starts the process from step S2200 of FIG. 22, and advances the process to step S2205 to acquire a curve radius R.

The curve radius R is the minimum curve radius of a curved road that the target vehicle 100 is predicted to enter (entry-predicted curved road). In particular, the curve radius R is the minimum curvature radius of a middle line between the right and left lane lines that define the target-vehicle traveling lane LN on the entry-predicted curved road. Since the right and left lane lines are acquired from the camera image information IC, it can be said that the curve radius R is also acquired from the camera image information IC.

Next, the vehicle driving assist device 10 advances the process to step S2210, and determines whether strain is present.

The degree of strain in this example indicates a point ahead of the target vehicle 100 (look-ahead point) at which the driver is presumed to look when the driver causes the target vehicle 100 to enter the curved road. When determination is made that the degree of strain is high (i.e., when determination is made that strain is present), the degree of strain indicates that the look-ahead point is a relatively far point ahead of the target vehicle 100. When determination is made that the degree of strain is low (i.e., when determination is made that strain is not present), the degree of strain indicates that the look-ahead point is a relatively near point ahead of the target vehicle 100.

In this example, the presence or absence of strain is determined based on the curve radius R acquired in step S2205 and the current target-vehicle speed V.

Figure 24:
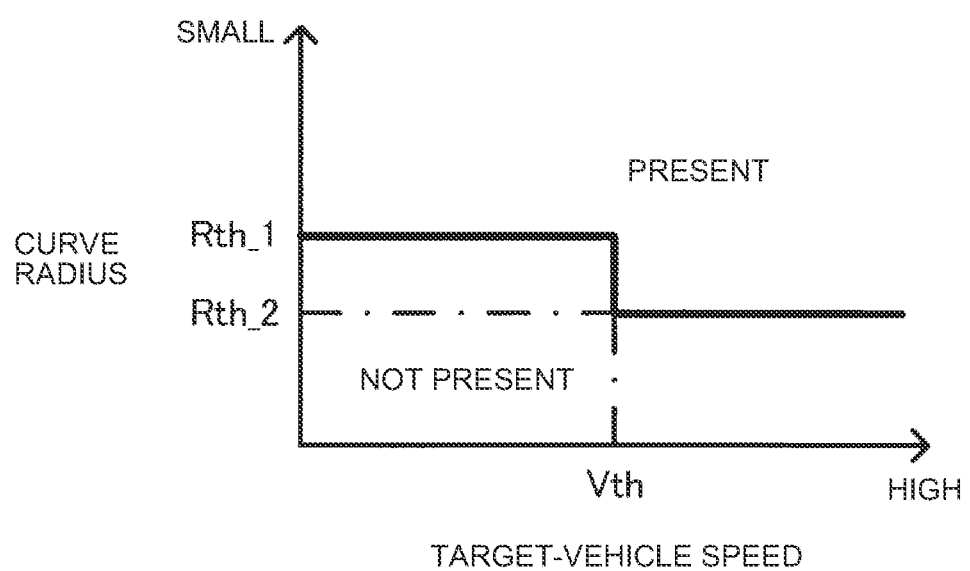
FIG. 24 is a diagram showing the presence or absence of strain to be determined based on a traveling speed of the target vehicle (target-vehicle speed) and a curve radius.

More specifically, as shown in FIG. 24, the vehicle driving assist device 10 determines that strain is not present when the target-vehicle speed V is in a range lower than a predetermined vehicle speed Vth and the curve radius R is larger than a predetermined value (first radius Rth_1), and determines that strain is present when the curve radius R is equal to or smaller than the first radius Rth_1.

The vehicle driving assist device 10 determines that strain is not present when the target-vehicle speed V is in a range equal to or higher than the predetermined vehicle speed Vth and the curve radius R is larger than a predetermined value (second radius Rth_2) larger than the first radius Rth_1, and determines that strain is present when the curve radius R is equal to or smaller than the second radius Rth_2.

In this example, the vehicle driving assist device 10 determines the presence or absence of strain based on both the curve radius R and the target-vehicle speed V, but may determine the presence or absence of strain based only on the curve radius R.

When the determination result is "No" in step S2210, the vehicle driving assist device 10 advances the process to step S2215, and sets a look-ahead period T to a first period T1.

Next, the vehicle driving assist device 10 advances the process to step S2220, and acquires a look-ahead distance D by using the look-ahead period T (first period T1) set in step S2215 and the target-vehicle speed V.

The look-ahead distance D is a distance from the target vehicle 100 to the point at which the driver is presumed to look (look-ahead point). In this example, the look-ahead distance D is acquired by calculation according to Equation 5.

$$D = V \times T \tag{5}$$

Next, the vehicle driving assist device 10 advances the process to step S2225, and acquires a look point curvature p by using the look-ahead distance D acquired in step S2220 and the camera image information IC.

The look point curvature p is a curvature of the target-vehicle traveling road RD ahead of the target vehicle 100 at the look-ahead distance D, that is, a curvature of the target-vehicle traveling lane LN at a point ahead of the target vehicle 100 at which the driver facing the curved road having the curve radius R is presumed to look. When the curve radius R is small, a curvature of the target-vehicle traveling lane LN at a farther point ahead of the target vehicle 100 than the point when the curve radius R is large is acquired as the look point curvature ρ.

Figures 25A, 25B:
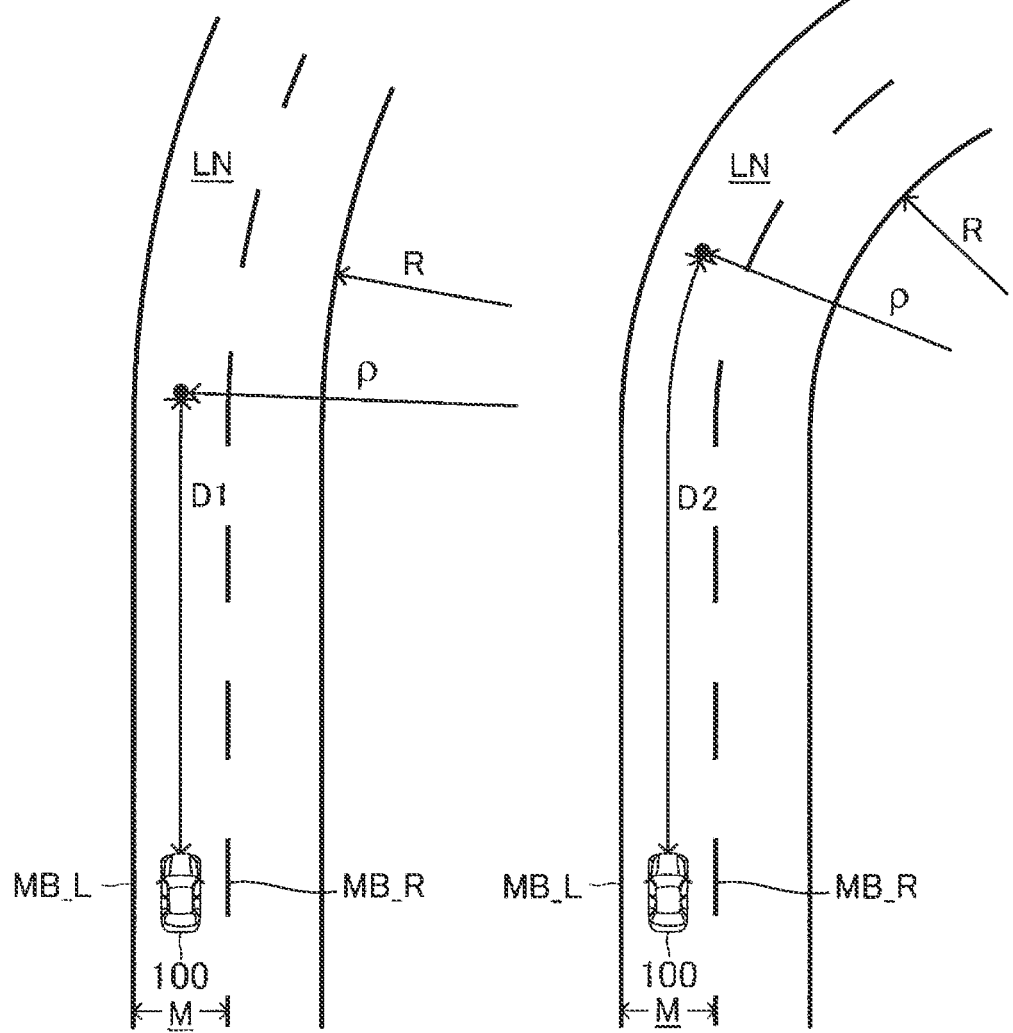
FIG. 25A is a diagram showing a situation where the target vehicle enters a gently curved road.
FIG. 25B is a diagram showing a situation where the target vehicle enters a sharply curved road.

For example, when the curve radius R is large as shown in FIG. 25A (i.e., when the curved road that the target vehicle 100 is predicted to enter is a gently curved road), the vehicle driving assist device 10 acquires, as the look point curvature ρ, a curvature of the target-vehicle traveling lane LN ahead of the target vehicle 100 at a first distance D1. When the curve radius R is small as shown in FIG. 25B (i.e., when the curved road that the target vehicle 100 is predicted to enter is a sharply curved road), the vehicle driving assist device 10 acquires, as the look point curvature ρ, a curvature of the target-vehicle traveling lane LN ahead of the target vehicle 100 at a second distance D2 longer than the first distance D1. Therefore, when the acquired curve radius R is small, the vehicle driving assist device 10 acquires, as the look point curvature ρ, the curvature of the target-vehicle traveling lane LN at a farther point ahead of the target vehicle 100 than the point when the acquired curve radius R is large.

Next, the vehicle driving assist device 10 advances the process to step S2230, and acquires a guide steering angle δguide by using the look point curvature p acquired in step S2225.

In this example, the guide steering angle δguide is acquired by calculation according to Equation 6.

$$\delta \text{guide} = n \times K \times (1+A \times V^2) \times L \times \rho \quad (6)$$

In Equation 6, "n" is a gear ratio of the steering box, "K" is a coefficient (adapted value) obtained through experiments etc. so that the guide steering angle δguide can be acquired by Equation 6 as a value at which the target vehicle 100 can smoothly travel along a curved road, "A" is a so-called stability factor, "V" is a target-vehicle speed, and "L" is a wheelbase of the target vehicle 100.

Next, the vehicle driving assist device 10 advances the process to step S2255, and acquires a difference between the guide steering angle δguide acquired in step S2230 and a current steering angle δ as a guide steering angle difference Δδguide. That is, the guide steering angle difference Δδguide is acquired by calculation according to Equation 7.

$$\Delta\delta \text{guide} = \delta \text{guide} - \delta \quad (7)$$

Next, the vehicle driving assist device 10 advances the process to step S2260, and acquires a guide steering angle steering reaction force RFguide by using the guide steering angle difference Δδguide acquired in step S2255.

In this example, the guide steering angle steering reaction force RFguide is set to a smaller value as the guide steering angle difference Δδguide increases. The vehicle driving assist device 10 may set the guide steering angle steering reaction force RFguide by using an arithmetic expression, or by storing a map of the guide steering angle steering reaction force RFguide that uses the guide steering angle difference Δδguide as an argument and applying the guide steering angle difference Δδguide to the map.

Next, the vehicle driving assist device 10 advances the process to step S2265, and executes the process from step S2265 to step S2280. The process from step S2265 to step S2280 is the same as the process from step S205 to step S220 in the routine shown in FIG. 2.

After the process of step S2280 is executed, the vehicle driving assist device 10 advances the process to step S2285, and sets, as the target assist steering force Ftgt, a value obtained by summing the guide steering angle steering reaction force RFguide acquired in step S2260 and the limit steering angle assist steering force Fδlim acquired in step S2280 (Ftgt=RFguide+Fδlim).

Next, the vehicle driving assist device 10 advances the process to step S2290, and applies an assist steering force corresponding to the target assist steering force Ftgt set in step S2285 to the steering wheel 31. Then, the vehicle driving assist device 10 advances the process to step S2295, and temporarily terminates the process of the current routine.

In this example, a smaller steering reaction force is applied to the steering wheel 31 as the look point curvature p increases.

When the determination result is "Yes" in step S2210, the vehicle driving assist device 10 advances the process to step S2235, and sets the look-ahead period T to a second period T2 longer than the first period T1.

Next, the vehicle driving assist device 10 advances the process to step S2240, and acquires a look-ahead distance D by calculation according to Equation 5 using the look-ahead period T (second period T2) set in step S2235.

Since the second period T2 is longer than the first period T1, the look-ahead distance D acquired when determination is made that strain is present is longer than the look-ahead distance D acquired when determination is made that strain is not present.

Next, the vehicle driving assist device 10 advances the process to step S2245, and acquires a look point curvature p as described above by using the look-ahead distance D acquired in step S2240.

Next, the vehicle driving assist device 10 advances the process to step S2250, and acquires a guide steering angle δguide by calculation according to Equation 6 using the look point curvature p acquired in step S2245.

Since the look-ahead distance D when strain is present is longer than the look-ahead distance D when strain is not present, the look point curvature p acquired when strain is present tends to be larger than the look point curvature p acquired when strain is not present.

Next, the vehicle driving assist device 10 advances the process to step S2255, and acquires a guide steering angle difference Δδguide by calculation according to Equation 7 using the guide steering angle δguide acquired in step S2250.

Next, the vehicle driving assist device 10 advances the process to step S2260, and acquires a guide steering angle steering reaction force RFguide as described above by using the guide steering angle difference Δδguide acquired in step S2255.

Next, the vehicle driving assist device 10 advances the process to step S2265, and executes the process from step S2265 to step S2280. The process from step S2265 to step S2280 is the same as the process from step S205 to step S220 in the routine shown in FIG. 2.

After the process of step S2280 is executed, the vehicle driving assist device 10 advances the process to step S2285, and sets, as the target assist steering force Ftgt, a value obtained by summing the guide steering angle steering reaction force RFguide acquired in step S2260 and the limit steering angle assist steering force Fδlim acquired in step S2280.

Next, the vehicle driving assist device 10 advances the process to step S2290, and applies an assist steering force corresponding to the target assist steering force Ftgt set in step S2285 to the steering wheel 31. Then, the vehicle driving assist device 10 advances the process to step S2295, and temporarily terminates the process of the current routine.

Figure 26A:
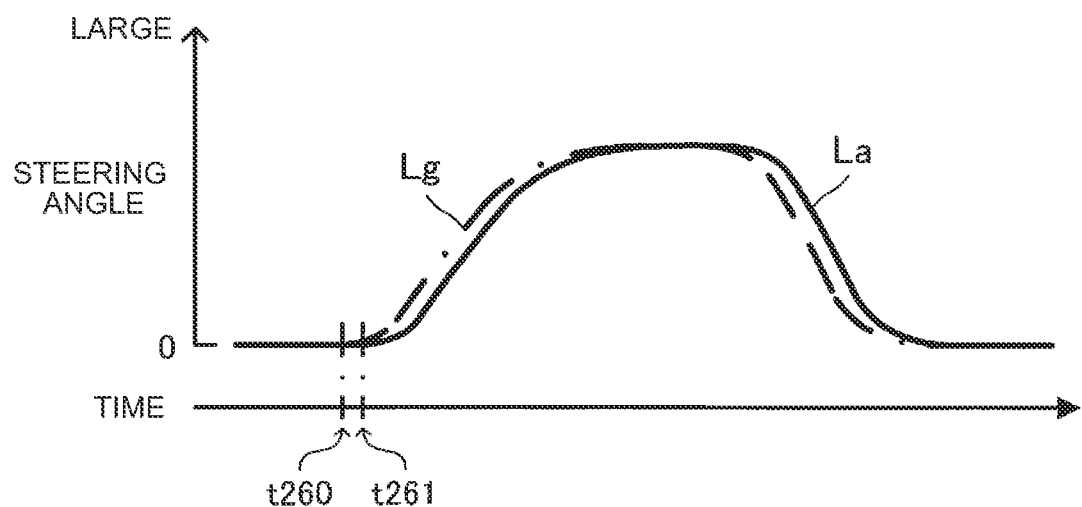
FIG. 26A is a diagram showing a relationship between a guide steering angle and an actual steering angle in the situation where the target vehicle enters the gently curved road.

When the target vehicle 100 is predicted to enter a gently curved road, the acquired guide steering angle δguide changes as shown in FIG. 26A. In FIG. 26A, a line Lg indicates a change in the guide steering angle δguide, and a line La indicates a change in the steering angle δ. At time t260, the guide steering angle δguide starts to increase from zero. At time t261, the steering angle δ starts to increase from zero.

Figure 26B:
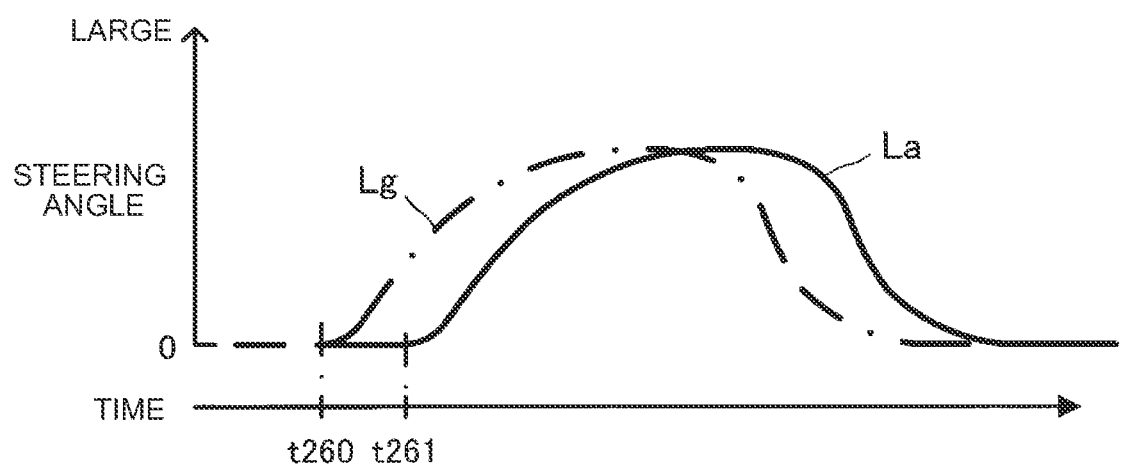
FIG. 26B is a diagram showing a relationship between the guide steering angle and the actual steering angle in the situation where the target vehicle enters the sharply curved road.

When the target vehicle 100 is predicted to enter a sharply curved road, the acquired guide steering angle δguide changes as shown in FIG. 26B. In FIG. 26B, a line Lg indicates a change in the guide steering angle δguide, and a line La indicates a change in the steering angle δ. At time t260, the guide steering angle δguide starts to increase from zero. At time t261, the steering angle δ starts to increase from zero.

Comparison between the change in the guide steering angle δguide shown in FIG. 26A and the change in the guide steering angle δguide shown in FIG. 26B demonstrates that, when the curved road that the target vehicle 100 is predicted to enter (entry-predicted curved road) is a sharply curved road, the guide steering angle δguide increases at a timing earlier than that when the entry-predicted curved road is a gently curved road. Thus, when the entry-predicted curved road is a sharply curved road, the steering reaction force is reduced at a timing earlier than that when the entry-predicted curved road is a gently curved road. Accordingly, when the target vehicle 100 approaches a sharply curved road and the driver starts to rotate the steering wheel 31, the steering reaction force has already been reduced. Therefore, the driver can quickly rotate the steering wheel 31. As a result, even if the curved road is a sharply curved road, the target vehicle 100 can smoothly travel along the curved road. Thus, the vehicle driving assist device 10 can adjust the steering reaction force so that the driver can smoothly drive the target vehicle 100 along the curved road.

When the entry-predicted curved road is a sharply curved road, the guide steering angle δguide increases or decreases in advance of the change in the actual steering angle δ while the target vehicle 100 is traveling along the entry-predicted curved road. Therefore, even if the curved road is a sharply curved road, the target vehicle 100 can smoothly travel along the curved road.

When the entry-predicted curved road is a gently curved road, the guide steering angle δguide increases or decreases in analogy to the change in the actual steering angle δ while the target vehicle 100 is traveling along the entry-predicted curved road. Therefore, the steering reaction force is adjusted in analogy to that for an actual steering wheel rotation operation of the driver.

When the vehicle driving assist device 10 is configured to execute the routine shown in FIG. 23 and advances the process to step S2103, the vehicle driving assist device 10 starts the process from step S2300 of FIG. 23, and advances the process to step S2305 to acquire a target steering angle δtgt.

The target steering angle δtgt is a steering angle δ in accordance with a target of change in the steering angle (steering angle change target) for causing the target vehicle 100 to suitably travel along a curved road. In this example, the target steering angle δtgt is acquired by calculation according to Equation 8.

$$\delta tgt = f(t) \tag{8}$$

In Equation 8, "t" is a time at which the driver starts to rotate the steering wheel 31 from the neutral position to drive the target vehicle 100 along the curved road (steering wheel operation start time). Therefore, in Equation 8, "f(t)" is a function whose variable is the steering wheel operation start time t.

Next, the vehicle driving assist device 10 advances the process to step S2310, and acquires a curve radius R and a target-vehicle speed V.

Next, the vehicle driving assist device 10 advances the process to step S2315, and acquires a preview period τ and a gain "a" by using the curve radius R and the target-vehicle speed V acquired in step S2310. The preview period τ is a period for advancing the time to start the setting of the guide steering angle δguide.

In this example, the preview period τ and the gain "a" are acquired by applying the curve radius R and the target-vehicle speed V to Equations 9 and 10.

$$\tau = H(R, V) \tag{9}$$

$$a = G(R, V) \tag{10}$$

In Equation 9, "H(R,V)" is a function whose variables are the curve radius R and the target-vehicle speed V. According to Equation 9, when the curve radius R is small, a longer preview period τ is acquired as compared with a case where the curve radius R is large. In particular, a longer preview period τ is acquired as the curve radius R decreases. According to Equation 9, when the curve radius R is larger than zero, a preview period τ larger than zero is acquired. According to Equation 9, when the target-vehicle speed V is high, a longer preview period τ is acquired as compared with a case where the target-vehicle speed V is low. In particular, a longer preview period τ is acquired as the target-vehicle speed V increases.

In Equation 10, "G(R,V)" is a function whose variables are the curve radius R and the target-vehicle speed V. According to Equation 10, when the curve radius R is small, a gain "a" having a smaller value is acquired as compared with the case where the curve radius R is large. In particular, a gain "a" having a smaller value is acquired as the curve radius R decreases. According to Equation 10, when the target-vehicle speed V is high, a smaller gain "a" is acquired as compared with the case where the target-vehicle speed V is low. In particular, a smaller gain "a" is acquired as the target-vehicle speed V increases. The gain "a" acquired from Equation 10 is a value larger than zero and equal to or smaller than "1". According to Equation 10, when the curve radius R is larger than zero, at least a gain "a" smaller than "1" is acquired.

A linear expression, a quadratic expression, or a sigmoid function can be used as each of the function H(R,V) and the function G(R,V). Alternatively, each of the function H(R,V) and the function G(R,V) may be stored in the form of a map (or a look-up table), and the preview period τ and the gain "a" may be acquired by applying the curve radius R and the target-vehicle speed V to the map. Alternatively, the presence or absence of strain may be determined based on the target-vehicle speed V and the curve radius R as described above. A relatively short period may be set as the preview period τ when strain is not present, and a period longer than that period may be set as the preview period τ when strain is present.

Next, the vehicle driving assist device 10 advances the process to step S2320, and acquires a guide steering angle δguide by using the preview period τ and the gain "a" acquired in step S2315.

In this example, the guide steering angle δguide is acquired by calculation according to Equation 11.

$$\delta \text{guide} = a \times f(t - \tau) \tag{11}$$

In Equation 11, "t" is the steering wheel operation start time.

Figure 27A:
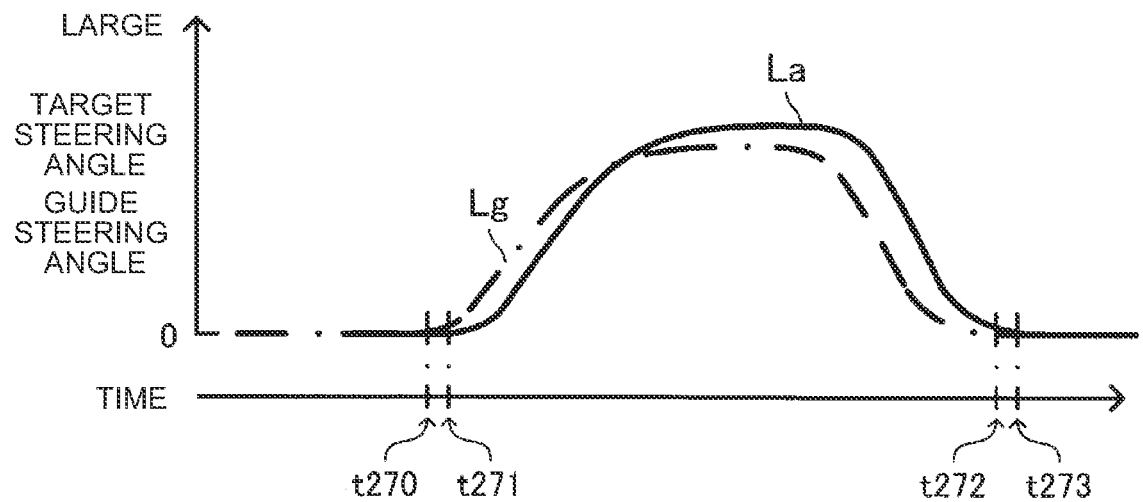
FIG. 27A is a diagram showing changes in the guide steering angle and a target steering angle to be set when the curve radius is large and the target-vehicle speed is low.
Figure 27B:
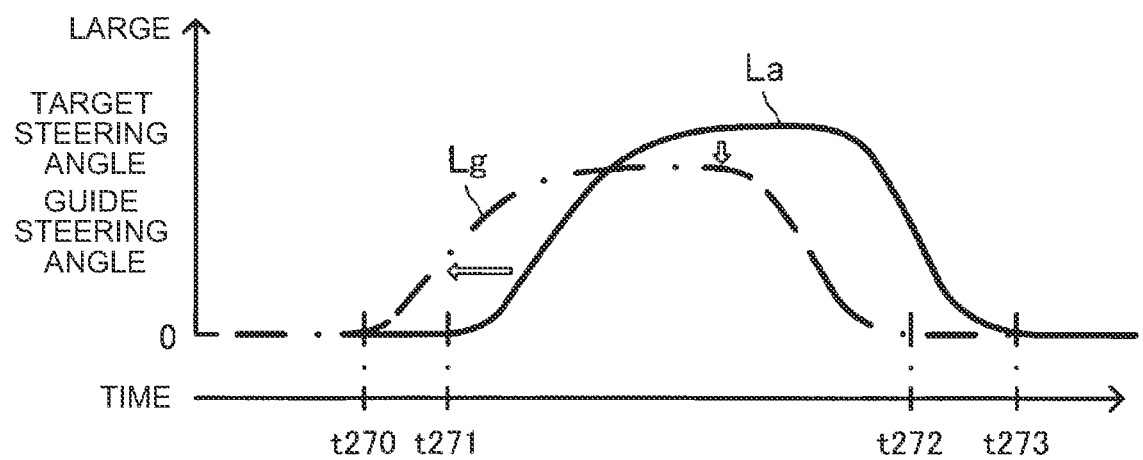
FIG. 27B is a diagram showing changes in the guide steering angle and the target steering angle to be set when the curve radius is small and the target-vehicle speed is high.

The target steering angle δtgt acquired from Equation 11 starts to be larger than zero at time t271 (steering wheel operation start time t) as indicated by a line La in FIGS. 27A and 27B. With an elapse of time, the target steering angle δtgt gradually increases, reaches its maximum value, then gradually decreases, and reaches zero at time t273 at which the target vehicle 100 finishes traveling on the curved road.

The guide steering angle δguide acquired from Equation 11 starts to be larger than zero at time t270 earlier than time t271 (steering wheel operation start time t) as indicated by a line Lg in FIGS. 27A and 27B. With an elapse of time, the guide steering angle δguide gradually increases, reaches its maximum value δmax, then gradually decreases, and reaches zero at time t272 earlier than time t273 at which the target vehicle 100 finishes traveling on the curved road.

In this example, when a curved road is detected and the curve radius R of the curved road is acquired, a preview period τ larger than zero is set. Therefore, the setting of the guide steering angle δguide is started at time t270 earlier than the steering wheel operation start time t (time t271). In other words, the guide steering angle δguide is larger than zero from time t270 earlier than the steering wheel operation start time t (time t271).

In this example, when a curved road is detected and the curve radius R of the curved road is acquired, a gain "a" smaller than "1" is set. Therefore, the maximum value δmax of the guide steering angle δguide is smaller than the maximum value of the target steering angle δtgt.

When the curve radius R is small, the preview period τ is set longer than that when the curve radius R is large. Therefore, when the curve radius R is small, time t270 at which the setting of the guide steering angle δguide is started is earlier than the steering wheel operation start time t (time t271) as compared with the case where the curve radius R is large.

When the target-vehicle speed V is high, the preview period τ is set longer than that when the target-vehicle speed V is low. Therefore, when the target-vehicle speed V is high, time t270 at which the setting of the guide steering angle δguide is started is earlier than the steering wheel operation start time t (time t271) as compared with the case where the target-vehicle speed V is low.

When the curve radius R is small, the gain "a" is set to a smaller value than that when the curve radius R is large. Therefore, when the curve radius R is small, the maximum value δmax of the guide steering angle δguide is set to a smaller value than that when the curve radius R is large.

When the target-vehicle speed V is high, the gain "a" is set to a smaller value than that when the target-vehicle speed V is low. Therefore, when the target-vehicle speed V is high, the maximum value δmax of the guide steering angle δguide is set to a smaller value than that when the target-vehicle speed V is low.

From the above, the guide steering angle δguide changes with the elapse of time as indicated by the line Lg in FIG. 27A when the curve radius R is large and the target-vehicle speed V is low. The guide steering angle δguide changes with the elapse of time as indicated by the line Lg in FIG. 27B when the curve radius R is small and the target-vehicle speed V is high.

Next, the vehicle driving assist device 10 advances the process to step S2325, and acquires a difference between the guide steering angle δguide acquired in step S2320 and the steering angle δ as a guide steering angle difference Δδguide.

Next, the vehicle driving assist device 10 advances the process to step S2330, and acquires a guide steering angle steering reaction force RFguide based on the guide steering angle difference Δδguide acquired in step S2325.

Next, the vehicle driving assist device 10 advances the process to step S2335, and executes the process from step S2335 to step S2350. The process from step S2335 to step S2350 is the same as the process from step S205 to step S220 in the routine shown in FIG. 2.

After the process of step S2350 is executed, the vehicle driving assist device 10 advances the process to step S2355, and sets, as the target assist steering force Ftgt, a value obtained by summing the guide steering angle steering reaction force RFguide acquired in step S2330 and the limit steering angle assist steering force Fδlim acquired in step S2350 (Ftgt=RFguide+Fδlim).

Next, the vehicle driving assist device 10 advances the process to step S2360, and applies an assist steering force corresponding to the target assist steering force Ftgt set in step S2355 to the steering wheel 31. Then, the vehicle driving assist device 10 advances the process to step S2395, and temporarily terminates the process of the current routine.

Therefore, when the actual steering angle is smaller than the guide steering angle δguide, the vehicle driving assist device 10 sets the steering reaction force to be smaller than a reference steering reaction force as the difference of the actual steering angle from the guide steering angle δguide (guide steering angle difference Δδguide) increases. When the actual steering angle is larger than the guide steering angle δguide, the vehicle driving assist device 10 sets the steering reaction force to be larger than the reference steering reaction force as the difference of the actual steering angle from the guide steering angle δguide (guide steering angle difference Δδguide) increases.

When the steering reaction force is reduced at the time at which the driver starts the steering wheel operation for driving the target vehicle 100 along the curved road (steering wheel operation start time t), the driver can easily operate the steering wheel for driving the target vehicle 100 along the curved road. However, there is a possibility that the steering wheel operation delays and the target vehicle 100 cannot suitably travel along the curved road.

With the vehicle driving assist device 10 of this example, the setting of the guide steering angle δguide (guide steering operation amount) is started at the timing earlier than the steering wheel operation start time t (steering operation start time). As a result, the steering reaction force is reduced at an earlier timing. Therefore, even when the curve radius R is small (when the degree of curve of the curved road is high), the steering wheel operation (steering operation) for causing the target vehicle 100 to travel along the curved road is performed without delay. As a result, the target vehicle 100 can suitably travel along the curved road.

When the curve radius R is small, the driver needs to operate the steering wheel more greatly to drive the target vehicle 100 along the curved road. Therefore, there is a strong possibility that the steering wheel operation of the driver delays.

With the vehicle driving assist device 10 of this example, when the curve radius R is small, the preview period τ (predetermined period) for advancing the timing to start the setting of the guide steering angle δguide is set to a long period. Therefore, the setting of the guide steering angle δguide is started at a timing earlier than the timing at which the driver starts the steering wheel operation for driving the target vehicle 100 along the curved road. As a result, the steering reaction force is reduced at an earlier timing. Thus, it is possible to suppress the delay in the steering wheel operation of the driver. While the target vehicle 100 is traveling along the curved road, the actual steering angle changes in agreement (or substantially in agreement) with the target steering angle δtgt. Accordingly, the target vehicle 100 can suitably travel along the curved road.

When the target-vehicle speed V is high, the driver needs to perform the steering wheel operation more quickly to drive the target vehicle 100 along the curved road. Therefore, there is a strong possibility that the steering wheel operation of the driver delays.

With the vehicle driving assist device 10 of this example, when the target-vehicle speed V is high, the preview period τ for advancing the timing to start the setting of the guide steering angle δguide is set to a long period. Therefore, the setting of the guide steering angle δguide is started at a timing earlier than the timing at which the driver starts the steering wheel operation for driving the target vehicle 100 along the curved road. As a result, the steering reaction force is reduced at an earlier timing. Thus, it is possible to suppress the delay in the steering wheel operation of the driver. While the target vehicle 100 is traveling along the curved road, the actual steering angle changes in agreement (or substantially in agreement) with the target steering angle δtgt. Accordingly, the target vehicle 100 can suitably travel along the curved road.

When driving the target vehicle 100 along the curved road, the driver increases the steering angle (amount of steering operation) and then reduces the steering angle. When the steering angle approaches the maximum value of the target steering angle δtgt (target steering operation amount) defined by the steering angle change target, the steering angle may exceed this maximum value.

With the vehicle driving assist device 10 of this example, the maximum value δmax of the guide steering angle δguide is limited to a value smaller than the maximum value of the target steering angle δtgt by a predetermined value. Therefore, when the steering angle approaches the maximum value of the target steering angle δtgt, the steering reaction force is increased. Thus, it is possible to reduce the occurrence of a case where the steering wheel operation of the driver exceeds the maximum value of the target steering angle δtgt. While the target vehicle 100 is traveling along the curved road, the actual steering angle changes in agreement (or substantially in agreement) with the target steering angle δtgt. Accordingly, the target vehicle 100 can suitably travel along the curved road.

When the target-vehicle speed V is high, the driver tends to operate the steering wheel more quickly to drive the target vehicle 100 along the curved road. Therefore, the steering wheel operation cannot be stopped at an appropriate steering angle, and the steering angle is likely to increase excessively.

With the vehicle driving assist device 10 of this example, when the target-vehicle speed V is high, the predetermined value for reducing the maximum value δmax of the guide steering angle δguide below the maximum value of the target steering angle δtgt is set to a large value. Therefore, when the steering angle approaches the maximum value of the target steering angle δtgt beyond the guide steering angle δguide in a state in which the target-vehicle speed V is high, the degree of increase in the steering reaction force is increased. Thus, it is possible to appropriately reduce the occurrence of the case where the steering angle exceeds the maximum value of the target steering angle δtgt. While the target vehicle 100 is traveling along the curved road, the actual steering angle changes in agreement (or substantially in agreement) with the target steering angle δtgt. Accordingly, the target vehicle 100 can suitably travel along the curved road.

In the above example, comparison is made under the assumption that the target vehicle 100 travels on a curved road with the same curve radius R. When the target-vehicle speed V is high, the gain "a" is set to a smaller value than when the target-vehicle speed V is low in order to reduce the occurrence of a case where the actual steering angle greatly exceeds the target steering angle δtgt. As a result, the maximum value of the guide steering angle δguide is reduced. Thus, a larger steering reaction force is applied to the steering wheel operation. Even though the target vehicle 100 travels on the curved road with the same curve radius R, when the target-vehicle speed V is high, the steering wheel operation needs to be performed more greatly than when the target-vehicle speed V is low in order that the target vehicle 100 appropriately travel along the curved road. Therefore, the actual steering angle is a larger value. When a larger steering reaction force is applied to the steering wheel operation, it difficult for the driver to operate the steering wheel.

Therefore, when the target-vehicle speed V is high, the vehicle driving assist device 10 sets the gain "a" to a smaller value than when the target-vehicle speed V is low in order to reduce the occurrence of the case where the actual steering angle greatly exceeds the target steering angle δtgt. The small value of the gain "a" may be limited to a value for reducing the difficulty of the driver's steering wheel operation.

When the curve radius R is small, the driver needs to operate the steering wheel more greatly to drive the target vehicle 100 along the curved road. Therefore, there is a strong possibility that the steering angle exceeds the maximum value of the target steering angle δtgt defined by the steering angle change target.

With the vehicle driving assist device 10 of this example, when the curve radius R is small, the predetermined value for reducing the maximum value δmax of the guide steering angle δguide below the maximum value of the target steering angle δtgt is set to a large value. Therefore, when the steering angle approaches the maximum value of the target steering angle δtgt in a state in which the curve radius R is small, the degree of decrease in the steering reaction force is reduced. That is, the steering reaction force is increased. Thus, it is possible to appropriately reduce the occurrence of the case where the steering angle exceeds the maximum value of the target steering angle δtgt. While the target vehicle 100 is traveling along the curved road, the actual steering angle changes in agreement (or substantially in agreement) with the target steering angle δtgt. Accordingly, the target vehicle 100 can suitably travel along the curved road.

When the target vehicle 100 is predicted to enter the curved road, the vehicle driving assist device 10 sets, as the steering angle change target, the target of change in the steering angle for causing the target vehicle 100 to suitably travel along a curved road, sets the guide steering angle δguide for guiding the driver's steering wheel operation to achieve the change in the steering angle in accordance with the steering angle change target when the target vehicle 100 travels along the curved road, reduce the steering reaction force when the steering angle is smaller than the guide steering angle δguide, and increases the steering reaction force when the steering angle is larger than the guide steering angle δguide.

What is claimed is:

1. A vehicle driving assist device comprising a control device configured to perform steering assist control for applying, to a steering operation, an assist steering force for assisting the steering operation, wherein:
   the steering operation is performed by a driver of a target vehicle to steer the target vehicle;
   the control device is configured to, in the steering assist control, set an upper limit value of a steering angle in a counterclockwise direction as a left limit steering angle, or an upper limit value of the steering angle in a clockwise direction as a right limit steering angle, the steering angle being a rotation angle of a steering shaft mounted on the target vehicle;
   the left limit steering angle is set based on a traveling condition of the target vehicle and a positional relationship between the target vehicle and a left traveling road boundary;
   the left traveling road boundary is a boundary on a left side of the target vehicle;
   the left traveling road boundary defines a traveling road where the target vehicle is traveling;
   the right limit steering angle is set based on the traveling condition and a positional relationship between the target vehicle and a right traveling road boundary;
   the right traveling road boundary is a boundary on a right side of the target vehicle;
   the right traveling road boundary defines the traveling road;
   the control device is configured to, in the steering assist control, when the steering angle exceeds in the counterclockwise direction the left limit steering angle, apply the assist steering force in the clockwise direction based on a difference between the steering angle and the left limit steering angle to the steering operation; and
   the control device is configured to, in the steering assist control, when the steering angle exceeds in the clockwise direction the right limit steering angle, apply the assist steering force in the counterclockwise direction based on a difference between the steering angle and the right limit steering angle to the steering operation.

2. The vehicle driving assist device according to claim 1, wherein the control device is configured to, when the left traveling road boundary or the right traveling road boundary is not settable, perform the steering assist control by using the left traveling road boundary or the right traveling road boundary that is settable.

3. The vehicle driving assist device according to claim 1, wherein:
   the control device is configured to set the left traveling road boundary and the right traveling road boundary based on lane boundaries and forward road environment information on an environment of a road ahead of the target vehicle; and
   the lane boundaries define a lane where the target vehicle is traveling.

4. The vehicle driving assist device according to claim 3, wherein:
   the control device is configured to acquire, as the forward road environment information, information indicating that a road where the target vehicle is traveling is a curved road; and
   the control device is configured to, when the information indicating that the road where the target vehicle is traveling is the curved road is acquired as the forward road environment information, set the left traveling road boundary and the right traveling road boundary to increase a turning radius of the target vehicle while the target vehicle is traveling on the curved road.

5. The vehicle driving assist device according to claim 3, wherein:
   the control device is configured to acquire, as the forward road environment information, information indicating that a road where the target vehicle is traveling is a curved road; and
   the control device is configured to, when the control device acquires the information indicating that the road where the target vehicle is traveling is the curved road as the forward road environment information, set the left traveling road boundary and the right traveling road boundary to cause the target vehicle to
      enter the curved road from a side closer to a lane boundary on an outer side of turning out of the lane boundaries than a lane boundary on an inner side of turning out of the lane boundaries,
      after the target vehicle enters the curved road, travel away from the lane boundary on the outer side of turning and closer to the lane boundary on the inner side of turning, and
      after the target vehicle travels closer to the lane boundary on the inner side of turning, travel away from the lane boundary on the inner side of turning and closer to the lane boundary on the outer side of turning, and exit the curved road from a side closer to the lane boundary on the outer side of turning.

6. The vehicle driving assist device according to claim 3, wherein:
   the control device is configured to acquire, as the forward road environment information, information indicating that an obstacle is present on a road ahead of the target vehicle; and
   the control device is configured to, when the information indicating that the obstacle is present on the road ahead of the target vehicle is acquired as the forward road environment information, set the left traveling road boundary and the right traveling road boundary to define the traveling road of the target vehicle off the obstacle.

7. The vehicle driving assist device according to claim 1, wherein:
- the control device is configured not to apply the assist steering force in the clockwise direction to the steering operation when the steering angle does not exceed the left limit steering angle in the counterclockwise direction; and
- the control device is configured not to apply the assist steering force in the counterclockwise direction to the steering operation when the steering angle does not exceed the right limit steering angle in the clockwise direction.

8. The vehicle driving assist device according to claim 1, wherein:
- the control device is configured to, when the steering angle exceeds the left limit steering angle in the counterclockwise direction, apply, to the steering operation, the assist steering force in the clockwise direction that increases as the difference between the steering angle and the left limit steering angle increases; and
- the control device is configured to, when the steering angle exceeds the right limit steering angle in the clockwise direction, apply, to the steering operation, the assist steering force in the counterclockwise direction that increases as the difference between the steering angle and the right limit steering angle increases.

9. A vehicle driving assist method for performing steering assist control for applying, to a steering operation, an assist steering force for assisting the steering operation, the vehicle driving assist method comprising:
- setting, in the steering assist control, an upper limit value of a steering angle in a counterclockwise direction as a left limit steering angle or an upper limit value of the steering angle in a clockwise direction as a right limit steering angle, the steering operation being performed by a driver of a target vehicle to steer the target vehicle (100), the steering angle being a rotation angle of a steering shaft mounted on the target vehicle, the left limit steering angle being set based on a traveling condition of the target vehicle and a positional relationship between the target vehicle and a left traveling road boundary, the left traveling road boundary being a boundary on a left side of the target vehicle, the left traveling road boundary defining a traveling road where the target vehicle is traveling, the right limit steering angle being set based on the traveling condition and a positional relationship between the target vehicle and a right traveling road boundary, the right traveling road boundary being a boundary on a right side of the target vehicle, the right traveling road boundary defining the traveling road;
- applying, in the steering assist control, when the steering angle exceeds in the counterclockwise direction the left limit steering angle, the assist steering force based on a difference between the steering angle and the left limit steering angle in the clockwise direction to the steering operation; and
- applying, in the steering assist control, when the steering angle exceeds in the clockwise direction the right limit steering angle, the assist steering force in the counterclockwise direction based on a difference between the steering angle and the right limit steering angle to the steering operation.

10. A non-transitory storage medium storing instructions that are executable by one or more processors and that cause the one or more processors to perform functions, the one or more processors being included in a vehicle driving assist device including a control device configured to perform steering assist control for applying, to a steering operation, an assist steering force for assisting the steering operation, the functions comprising:
- setting, in the steering assist control, an upper limit value of a steering angle in a counterclockwise direction as a left limit steering angle or an upper limit value of the steering angle in a clockwise direction as a right limit steering angle, the steering operation being performed by a driver of a target vehicle to steer the target vehicle, the steering angle being a rotation angle of a steering shaft mounted on the target vehicle, the left limit steering angle being set based on a traveling condition of the target vehicle and a positional relationship between the target vehicle and a left traveling road boundary, the left traveling road boundary being a boundary on a left side of the target vehicle, the left traveling road boundary defining a traveling road where the target vehicle is traveling, the right limit steering angle being set based on the traveling condition and a positional relationship between the target vehicle and a right traveling road boundary, the right traveling road boundary being a boundary on a right side of the target vehicle, the right traveling road boundary defining the traveling road;
- applying, in the steering assist control, when the steering angle exceeds in the counterclockwise direction the left limit steering angle, the assist steering force in the clockwise direction based on a difference between the steering angle and the left limit steering angle to the steering operation; and
- applying, in the steering assist control, when the steering angle exceeds in the clockwise direction the right limit steering angle, the assist steering force in the counterclockwise direction based on a difference between the steering angle and the right limit steering angle to the steering operation.

* * * * *